United States Patent
Nakajima et al.

(10) Patent No.: US 9,103,111 B2
(45) Date of Patent: Aug. 11, 2015

(54) DEPLOYMENT SHELTER

(71) Applicant: Nippon Trex Co., Ltd., Aichi (JP)

(72) Inventors: Masaya Nakajima, Aichi (JP); Junya Suzuki, Aichi (JP); Nobuyuki Morioka, Aichi (JP)

(73) Assignee: Nippon Trex Co., Ltd., Aichi (JP)

( * ) Notice: Subject to any disclaimer, the term of this patent is extended or adjusted under 35 U.S.C. 154(b) by 0 days.

(21) Appl. No.: 14/187,509

(22) Filed: Feb. 24, 2014

(65) Prior Publication Data

US 2014/0202089 A1 Jul. 24, 2014

Related U.S. Application Data

(63) Continuation-in-part of application No. 13/800,083, filed on Mar. 13, 2013, now abandoned.

(30) Foreign Application Priority Data

Jan. 18, 2013 (JP) .................................. 2013-7652
Aug. 20, 2013 (JP) ............................... 2013-170631

(51) Int. Cl.
*E04B 1/344* (2006.01)
*E04B 1/343* (2006.01)
(Continued)

(52) U.S. Cl.
CPC ............... *E04B 1/3444* (2013.01); *E04B 1/343* (2013.01); *E04B 1/344* (2013.01); *E04B 1/3442* (2013.01); *E04H 3/28* (2013.01); *B60P 3/00* (2013.01); *E04B 1/34357* (2013.01); *E04H 15/48* (2013.01)

(58) Field of Classification Search
CPC ... E04B 1/3444; E04B 1/3442; E04B 1/3431; E04B 1/343; E04B 1/34305; E04B 1/34357; E04B 1/344; E04H 3/28; E04H 1/1205; E04H 15/48; E04H 15/44; E04H 15/46; E04H 15/42; E05F 1/1215
USPC ............... 52/68, 69, 71, 79.1, 79.5, 79.9
See application file for complete search history.

(56) References Cited

U.S. PATENT DOCUMENTS 3,216,433 A * 11/1965 D'Azzo ........................... 52/179
3,348,344 A * 10/1967 Tatevossian ...................... 52/22
(Continued)

FOREIGN PATENT DOCUMENTS

| JP | S59-31332 | 2/1984 |
| JP | H07-19554 | 4/1995 |
| JP | 2009510282 A | 3/2009 |

OTHER PUBLICATIONS

Japanese Office Action and English Translation for JP 2013170631 dated Feb. 14, 2014.

*Primary Examiner* — Joshua J Michener
*Assistant Examiner* — Babajide Demuren
(74) *Attorney, Agent, or Firm* — McCormick, Paulding & Huber LLP

(57) ABSTRACT

An object of the present invention is to provide a deployment shelter which can be changed between a stored state and a deployed state by smoothly driving movable panels. The deployment shelter 10 has a shelter main body 20 in which a floor panel 28 is coupled to a roof panel 29 via four poles. Movable roof panels 37a and 37b which are pivoted between stored positions and deployed positions are respectively attached to side portions of the roof panel 29, movable floor panels 41a and 41b which are pivoted between stored positions and deployed positions are respectively attached to side portions of the floor panel 28. Movable side panels 42a and 42b are respectively attached to the movable floor panels 41a and 41b. Movable end panels 43a and 43b which are pivoted between stored positions and deployed positions are respectively attached to poles. The movable roof panels, the movable floor panels, and the movable side panels are respectively driven by actuators so that they are opened and closed.

8 Claims, 27 Drawing Sheets

(51) Int. Cl.
  *E04H 3/28* (2006.01)
  *E04H 15/48* (2006.01)
  *B60P 3/00* (2006.01)

(56) References Cited

U.S. PATENT DOCUMENTS

| | | | | |
|---|---|---|---|---|
| 3,469,356 | A | * | 9/1969 | White .................. 52/71 |
| 4,073,038 | A | * | 2/1978 | Curry et al. .................. 16/301 |
| 4,155,204 | A | * | 5/1979 | Prozinski .................. 52/69 |
| 4,232,488 | A | * | 11/1980 | Hanley .................. 52/7 |
| 4,464,868 | A | * | 8/1984 | Howroyd .................. 52/69 |
| 4,534,141 | A | * | 8/1985 | Fagnoni .................. 52/68 |
| 4,545,171 | A | * | 10/1985 | Colvin .................. 52/79.5 |
| 4,635,412 | A | * | 1/1987 | Le Poittevin .................. 52/79.5 |
| 4,660,332 | A | * | 4/1987 | Colvin, Jr. .................. 52/79.5 |
| 4,689,924 | A | * | 9/1987 | Jurgensen .................. 52/67 |
| 4,780,996 | A | * | 11/1988 | Julien, Jr. .................. 52/68 |
| 5,345,730 | A | * | 9/1994 | Jurgensen .................. 52/64 |
| 5,966,956 | A | * | 10/1999 | Morris et al. .................. 62/259.1 |
| 6,345,471 | B1 | * | 2/2002 | Gyllenhammar .................. 52/69 |
| 6,772,563 | B2 | * | 8/2004 | Kuhn .................. 52/67 |
| 6,997,495 | B1 | | 2/2006 | Groezinger |
| 7,117,645 | B2 | | 10/2006 | Bzorgi |
| 7,658,037 | B2 | * | 2/2010 | Bucher et al. .................. 52/67 |
| 7,828,367 | B2 | | 11/2010 | Hickam et al. |
| 7,841,136 | B2 | | 11/2010 | Czyznikiewicz |
| 7,882,659 | B2 | | 2/2011 | Gyory et al. |
| 7,918,053 | B2 | | 4/2011 | Bucher et al. |
| 8,166,715 | B2 | | 5/2012 | De Azambuja |
| 8,347,560 | B2 | | 1/2013 | Gyory et al. |
| 2002/0116878 | A1 | * | 8/2002 | Ciotti .................. 52/64 |
| 2003/0051417 | A1 | * | 3/2003 | Ciotti .................. 52/71 |
| 2005/0120639 | A1 | * | 6/2005 | Bucher et al. .................. 52/64 |
| 2006/0070306 | A1 | * | 4/2006 | Lin .................. 52/67 |
| 2009/0183440 | A1 | * | 7/2009 | Cheng .................. 52/101 |
| 2009/0217600 | A1 | | 9/2009 | De Azambuja |
| 2010/0269419 | A1 | * | 10/2010 | Gyory et al. .................. 52/79.5 |
| 2011/0259768 | A1 | * | 10/2011 | Campbell et al. .................. 206/216 |
| 2012/0060430 | A1 | | 3/2012 | Laprise et al. |
| 2012/0151851 | A1 | * | 6/2012 | Cantin et al. .................. 52/79.5 |
| 2012/0279142 | A1 | | 11/2012 | Michaud |

* cited by examiner

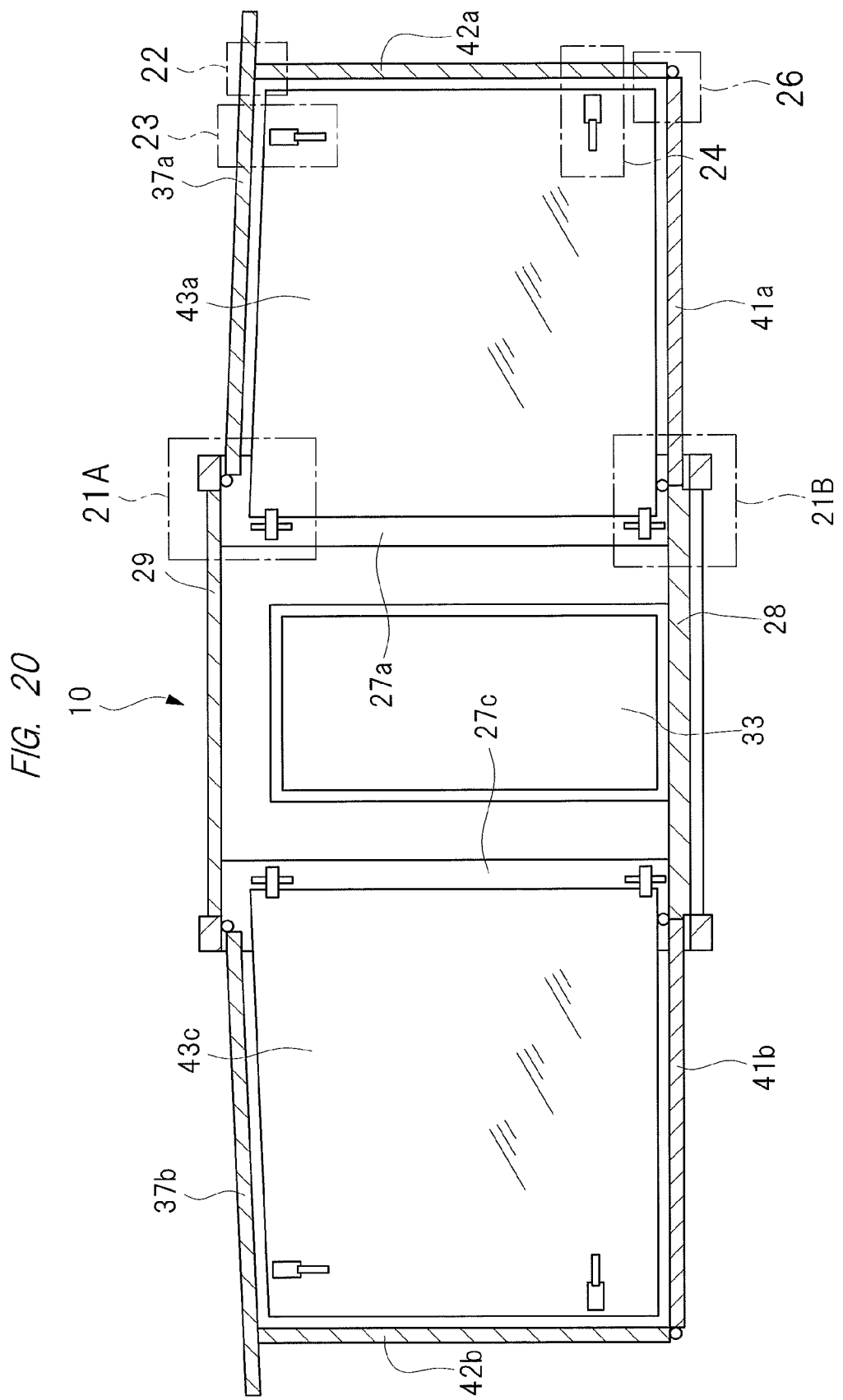

DEPLOYMENT SHELTER

CROSS-REFERENCE TO RELATED APPLICATION

The present application is a continuation-in-part of U.S. patent application Ser. No. 13/800,083 filed on Mar. 13, 2013, which claims priority under 35 U.S.C. §119 to Japanese Patent Application No. 2013-7652 filed on Jan. 18, 2013, the contents of which are hereby incorporated by reference into this application. The present application also claims priority under 35 U.S.C. §119 to Japanese Patent Application No. 2013-170631 filed on Aug. 20, 2013, the content of which is hereby incorporated by reference into this application.

TECHNICAL FIELD OF THE INVENTION

The present invention relates to a deployment shelter which can be changed in shape between a stored state and a deployed state.

BACKGROUND OF THE INVENTION

A shelter which can be conveyed by transportation means such as trailer, railroad or boats and ships, and which can be temporarily or continuously used has been developed. A transportable shelter has a rectangular parallelepiped shelter main body having a fixed structure corresponding to a container, and a floor panel is fixed to the shelter main body. A plurality of movable panels are provided on both sides of the shelter main body, they are movable between stored positions and deployed positions, and when the movable panels are deployed, an internal space of the shelter can be expanded. Medical equipment or business equipment is preliminarily mounted in the interior of the shelter, and when the movable panels are deployed at a usage time after transportation of the shelter, therapeutic intervention to a person can be conducted, a person can stay, and a meeting can be conducted in the shelter.

One example of a deployment shelter in which a plurality of movable panels is put in a stored state during transportation of the shelter and these movable panels are deployed before using is disclosed in U.S. Pat. No. 7,117,645.

This shelter has a front frame and a rear frame which are rectangular, respectively, upper portions of these frames are coupled to each other by a longitudinal beam member, and their lower portions are fixed with a flower panel. Main body side roof panels are fixed to the both sides of the beam member via hinges. A shelter main body with a fixed structure having the two frames and the longitudinal beam member is provided with foldable sections in which three movable panels are coupled to one another by hinges. Each section has: a movable floor panel continuous with the floor panel when deployed; a movable side panel coupled to the movable floor panel via a hinge; and a movable roof panel coupled to the movable side panel via a hinge and continuous with the main body side roof panel when deployed. The movable roof panel is coupled to the main body side roof panel by a hinge. When the shelter is stored or transported, the movable panels are folded. The movable panels are deployed before using.

When changing this shelter from a stored state to a deployed state, cables coupled to free ends of the movable floor panels are wound out of taking-up portions, so that the movable floor panels are deployed from vertical positions to horizontal positions with hinge portions serving as fulcrum points due to their self-weights. At this time, the movable side panels are also pivoted with the movable floor panels to reach horizontal positions. Hydraulic actuators for pivoting the movable side panels from the horizontal positions to the deployed positions are attached to the movable floor panels, and when the movable side panels are deployed up to their vertical positions, the movable roof panels coupled to the movable side panels via the hinges are driven from the stored positions where the movable roof panels are in a vertical state to deployed positions where the movable roof panels are in a horizontal state. At this time, the main body side roof panels coupled with the movable roof panels are pivoted about the hinges attached to the longitudinal beam member. When the movable panels are deployed, expanded internal spaces are formed in the shelter.

SUMMARY OF THE INVENTION

In this shelter, when the movable side panel is deployed, three movable panels including the movable side panel, the movable roof panel, and the main body side movable roof panel are simultaneously driven by the actuator. Therefore, the three movable panels are deployed while being changed in pivotal center, so that the movable panels cannot be deployed smoothly.

The shelter is provided with flexible sheets for covering both end portions of the expanded internal space, but since the internal space is covered with the sheets, the shielding performance of the internal space is reduced. A shelter of this type cannot be provided with a movable end panel, because it is necessary to prevent the movable end panel from strongly contacting with the three movable panels. If this shelter is modified so that the movable end panel is deployed without contacting with the three deployed movable panels, sealing performance between the deployed movable end panel and the three movable panels may be deteriorated.

Additionally, in the deployed state, since the hinge between the movable roof panel and the movable side panel, the hinge between the movable roof panel and the main body side roof panel, and the hinge between the longitudinal beam member and the main body side roof panel are exposed to the outside on the upper side of the shelter, each hinge portion is reduced in sealing performance, so that rain water may enter the internal space in the rain.

An object of the present invention is to provide a deployment shelter in which a plurality of movable panels can be driven smoothly between their stored states and their deployed states.

Another object of the present invention is to provide a deployment shelter having an internal space improved in water-tightness.

A deployment shelter according to the present invention has a floor panel and a roof panel fixed to the floor panel via poles arranged at four corners of the floor panel, and a shelter main body forming an internal space, the deployment shelter comprising: first and second movable roof panels which are respectively attached to one side portion and the other side portion of the roof panel via hinges, and which are pivoted to stored positions where the first and second movable roof panels extend in a vertical direction and deployed positions where the first and second movable roof panels extend laterally form the shelter main body; first and second movable floor panels which are respectively attached to one side portion and the other side portion of the floor panel via hinges, and which are pivoted to stored positions where the first and second movable floor panels extend in a vertical direction and deployed positions where the first and second movable floor panels extend laterally form the shelter main body; first and second movable side panels which are respectively attached to free ends of the movable floor panels via hinges, and which are pivoted to stored positions where the first and second movable side panels are stacked on inner faces of the movable floor panels and deployed positions where the first and second movable side panels are erected upward when the movable roof panels and the movable floor panels are in the deployed positions; four movable end panels which are respectively attached to the poles via hinges, and which are pivoted to stored positions where the movable end panels extend along side faces of the shelter main body and deployed positions where the internal space is formed by the movable roof panels, the movable floor panels, and the movable side panels which are in the deployed positions; first actuators which are arranged between the poles and the movable roof panels, and configured to drive the movable roof panels; second actuators which are arranged between the poles and the movable floor panels, and configured to drive the movable floor panels; and third actuators which are arranged between the movable floor panels and the movable side panels, and configured to drive the movable side panels.

Since the movable roof panels, the movable floor panels, and the movable side panels are automatically pivoted by the actuators, respectively, it is easy to perform a switching operation of the movable panels of the deployment shelter between the deployed states and the stored states. Since the movable roof panels, the movable floor panels, and the movable side panels are individually driven by respective actuators, it is possible to drive the actuators to smoothly open and close these movable panels.

Since the hinges coupling the movable panels are not exposed to rain water, rain water can be prevented from entering the internal space of the shelter from the hinges.

BRIEF DESCRIPTION OF THE DRAWINGS

FIG. 20 is a cross sectional view showing a state where all of the movable panels of the deployment shelter is deployed.

DESCRIPTION OF THE PREFERRED EMBODIMENTS

Figure 1:
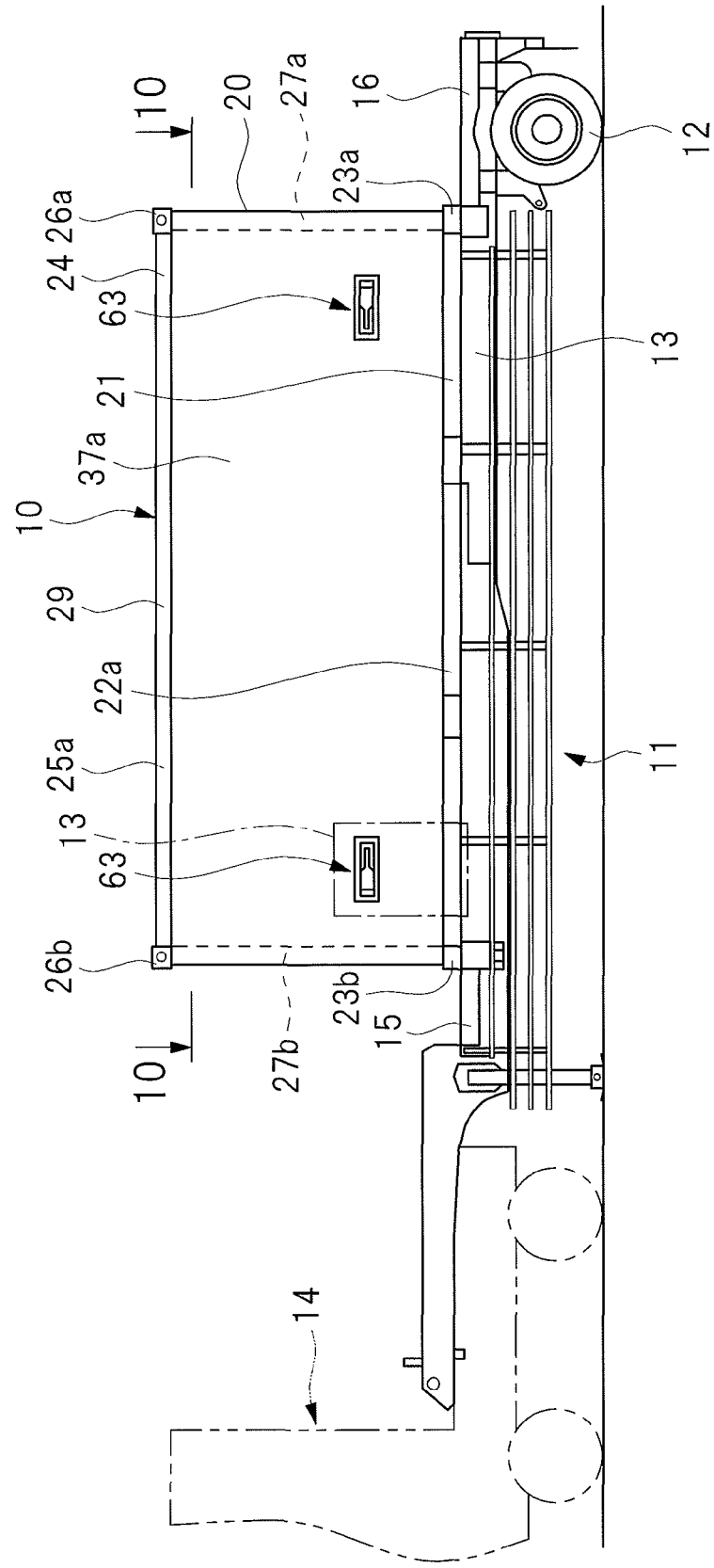
FIG. 1 is a side view showing a trailer loaded with a deployment shelter according to the present invention.

Hereinafter, embodiments of the present invention will be described in detail with reference to the drawings. As shown in FIGS. 1 to 5, a deployment shelter 10 can be installed on a trailer 11. In this specification, the term "deployment shelter 10" is hereinafter simply referred to as "shelter 10". The trailer 11 has a luggage carrier 13 having wheels 12, and a tractor 14 for pulling the luggage carrier 13.

The shelter 10 can be loaded on and unloaded from the luggage carrier 13. The shelter 10 is switchable between its deployed state and its stored state, and has a rectangular parallelepiped shape in the stored state. The shelter 10 is set to have dimensions similar to those of a general-purpose container to be loaded on the luggage carrier 13, and specifications required as the general-purpose container. Specifically, the shelter 10 in the stored state is the same as the general-purpose container in length, width, and height. A deck plate 15 is mounted on the front side end portion of the luggage carrier 13, a deck plate 16 is mounted on the rear side end portion of the luggage carrier 13, and the shelter 10 is loaded between the deck plates 15 and 16.

Figure 6:
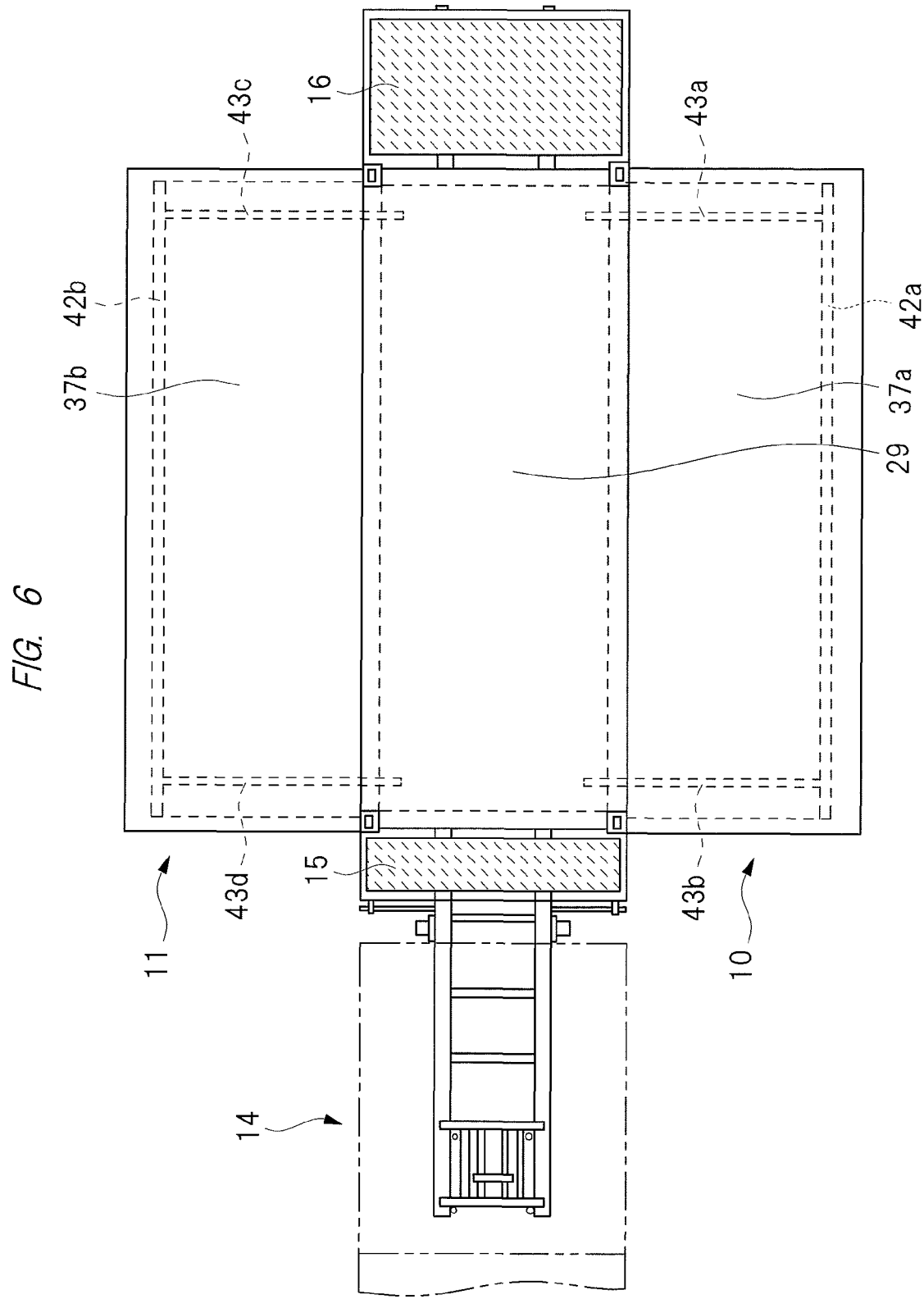
FIG. 6 is a plan view showing the deployed state of the deployment shelter loaded on the trailer.

The shelter 10 has a shelter main body 20 with a fixed structure. In FIG. 6, a front face of the shelter main body 20 is on the right side, and a back face of the shelter main body 20 is on the left side. As shown in FIGS. 7 to 11, the shelter main body 20 has a quadrilateral lower frame 21, and the lower frame 21 is formed with: two longitudinal beam members 22a and 22b arranged parallel to each other on both sides of its body; and two lateral beam members 23a and 23b arranged parallel to each other and coupled to the front and rear end portions of the longitudinal beam members 22a and 22b. The shelter main body 20 has an upper frame 24 arranged parallel to the lower frame 21, and the upper frame 24 is formed with: right and left longitudinal beam members 25a and 25b; and lateral beam members 26a and 26b arranged parallel to each other and coupled to the front and rear end portions of the longitudinal beam members 25a and 25b. The lower frame 21 and the upper frame 24 are coupled to each other via four poles 27a to 27d arranged at four corners of the frames. The upper and lower frames 21 and 24 and the poles 27a to 27d are made of metal, and collectively form a rectangular parallelepiped framework with a fixed structure.

A floor wall member, namely, a floor panel member 28a is fixed to the lower frame 21, and the lower frame 21 and the floor panel member 28a collectively form a floor panel 28. A top wall member, namely, a roof panel member 29a is fixed to the upper frame 24, and the upper frame 24 and the roof panel member 29a collectively form a roof panel 29. Each of the floor panel member 28a and the roof panel member 29a has a panel-shaped integral structure obtained by adhering aluminum plates, stainless plates or the like by hot-pressing, and they are fixed to respective frames.

Figure 7:
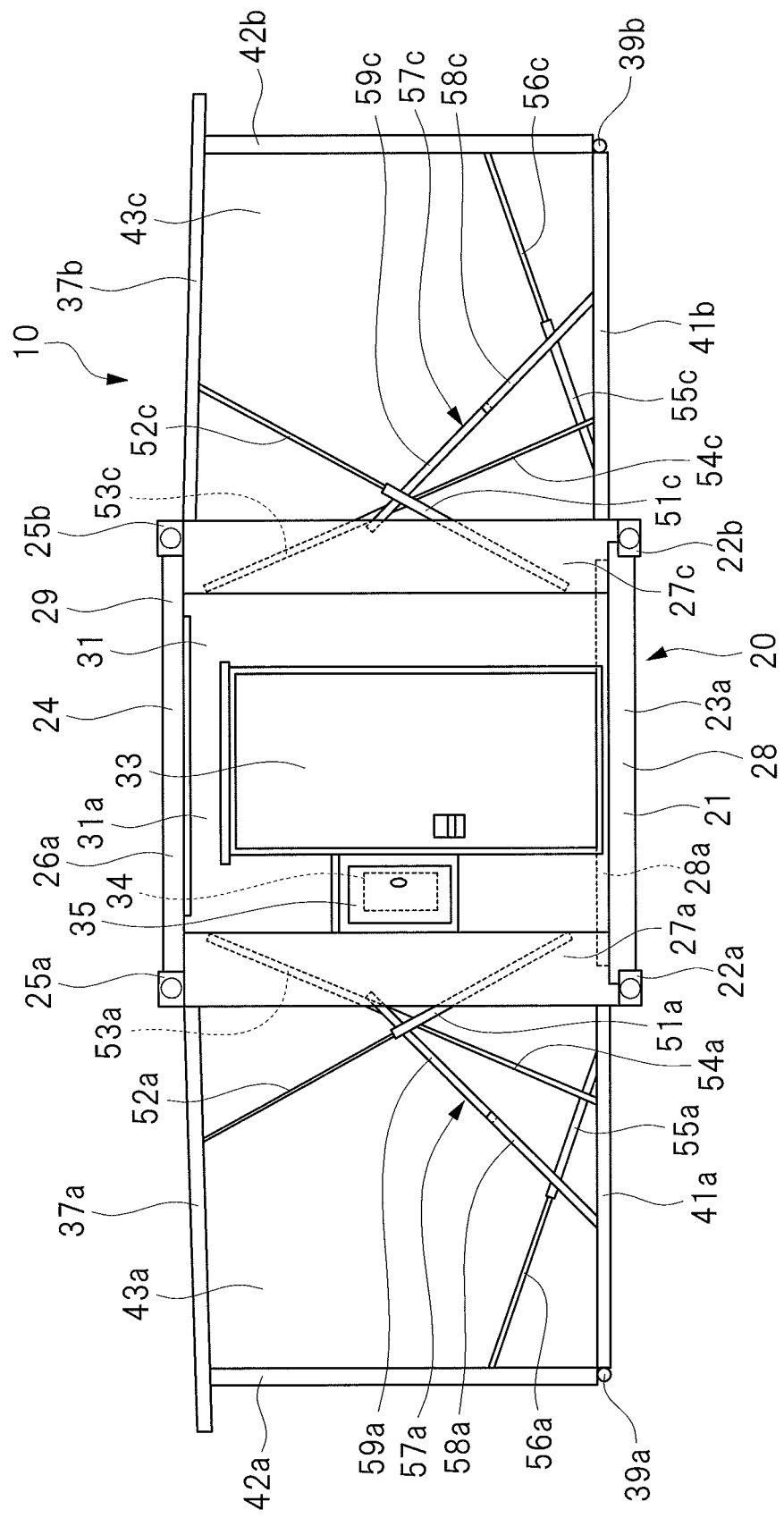
FIG. 7 is a front view showing only the deployment shelter in FIG. 4.

The shelter 10 has a panel-shaped first end panel member, namely, a front panel member 31a, and a panel-shaped second end panel member, namely, a rear panel member 32a, which are the same as the floor panel member 28a and the roof panel member 29a. The front panel member 31a is fixed to a frame formed of the upper and lower lateral beam members 26a and 23a and the poles 27a and 27c, and this frame and the front panel member 31a collectively form a front wall, namely, a front panel 31. The rear panel member 32a is fixed to a frame formed of the upper and lower lateral beam members 26b and 23b and the poles 27b and 27d, and this frame and the rear panel member 32a collectively form a rear wall, namely, a rear panel 32. As shown in FIG. 7, the front panel 31 is provided with an openable and closable door 33 enough for a user to go into and out of the internal space 10a of the shelter 10. The front panel 31 is provided with an operation unit 34 and an operation lid 35 covering the operation unit 34.

Figure 8:
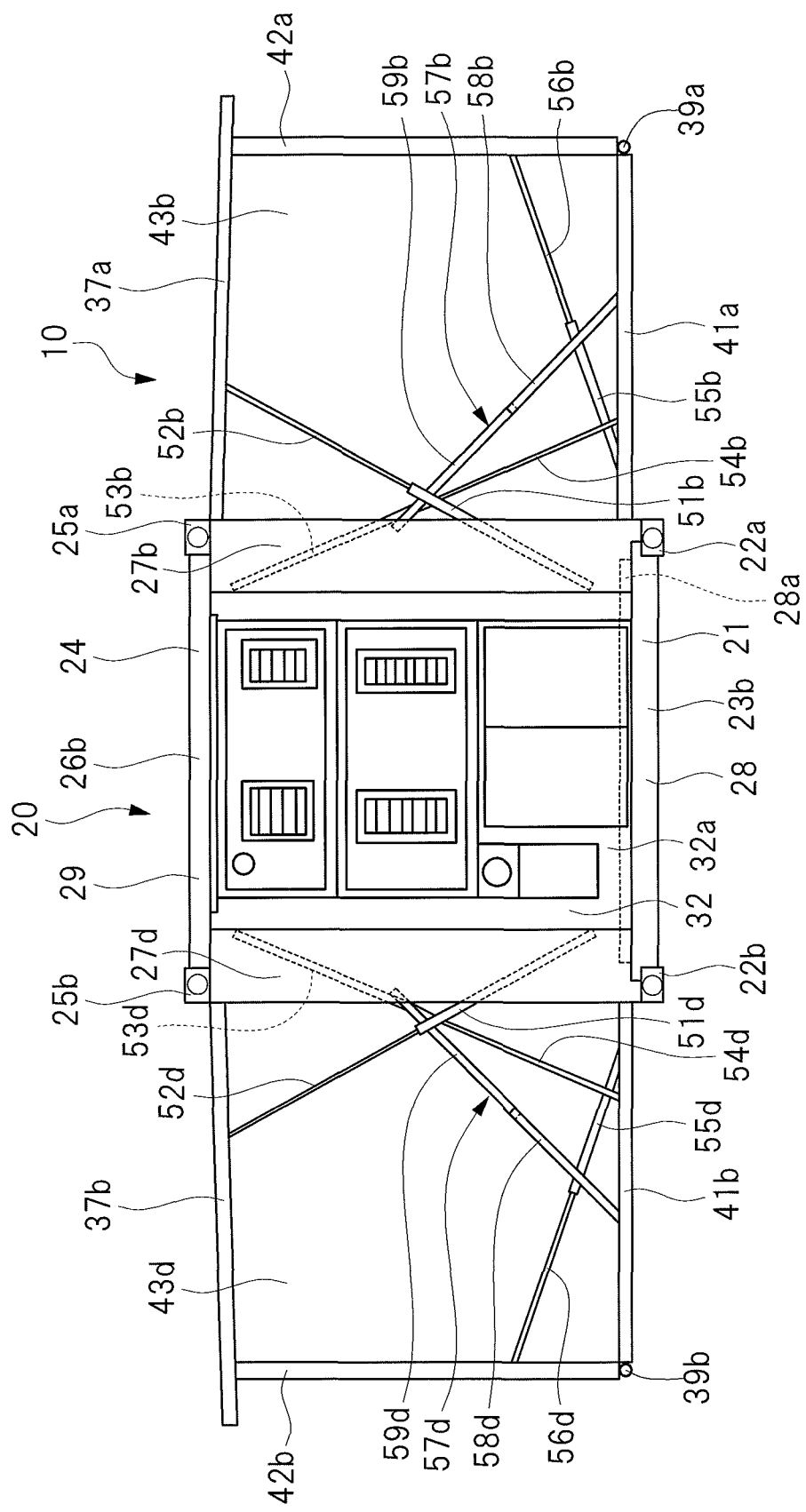
FIG. 8 is a rear view showing only the deployment shelter in FIG. 4.
Figure 9:
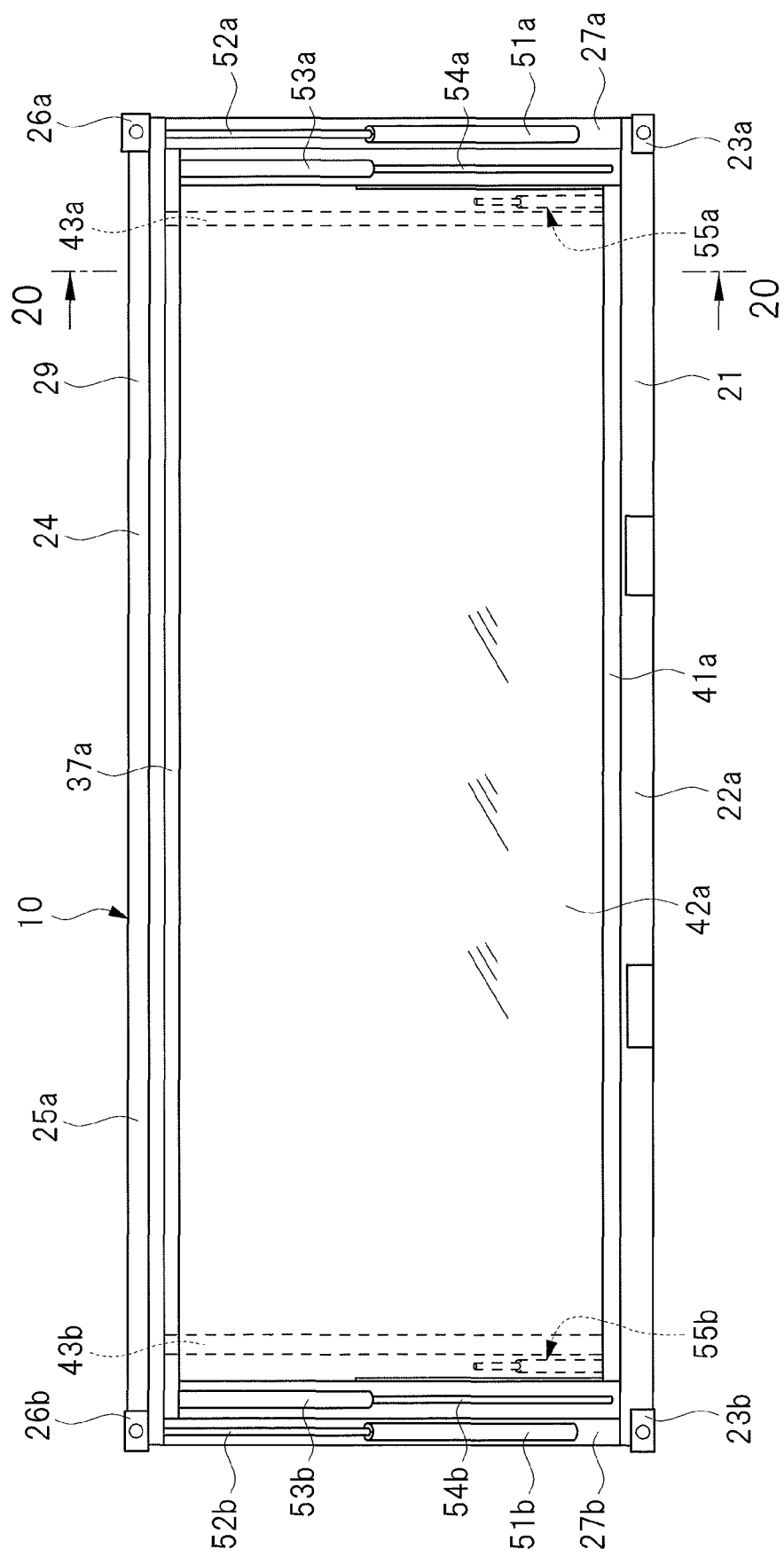
FIG. 9 is a left side view showing only the deployment shelter in FIG. 4.
Figure 11:
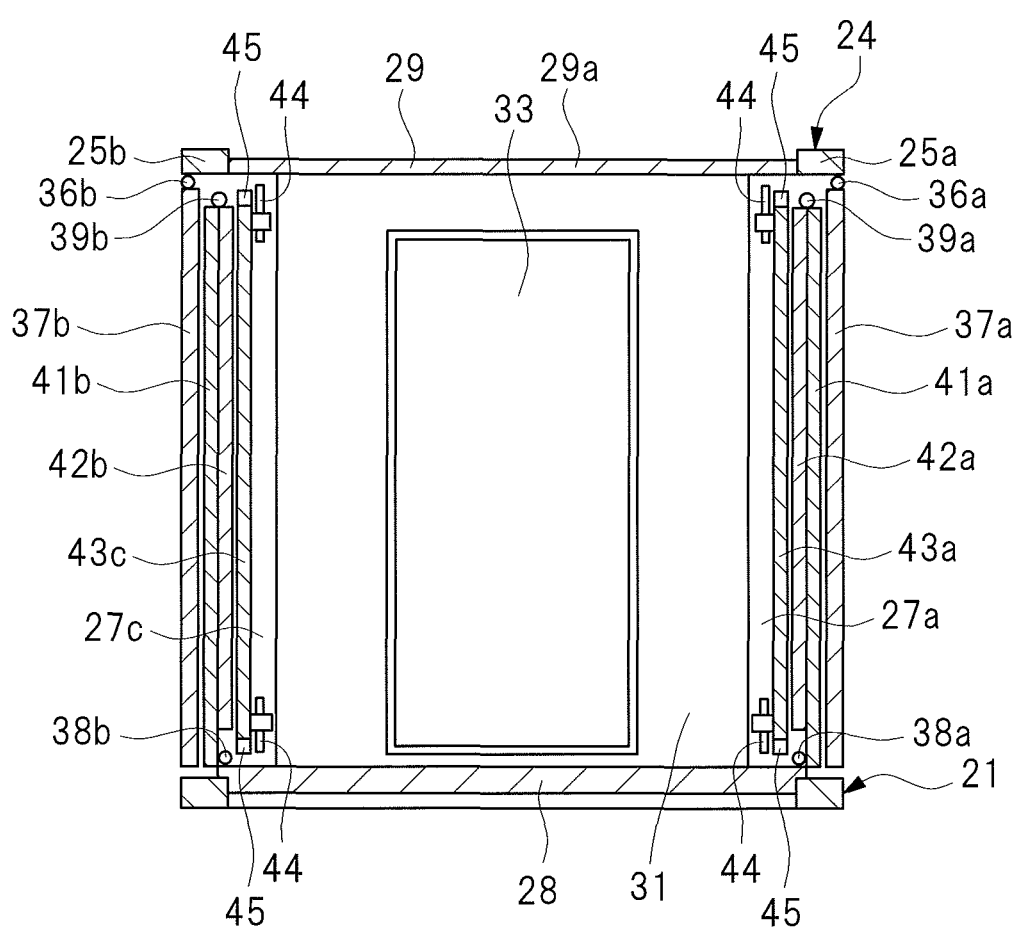
FIG. 11 is a sectional view taken along a line 11-11 in FIG. 10.

As shown in FIG. 11, a wing roof panel, namely, a movable roof panel 37a is pivotally attached to the longitudinal beam member 25a of the upper frame 24 constituting the roof panel 29 via a hinge 36a. Similarly, a movable roof panel 37b is pivotally attached to the longitudinal beam member 25b via a hinge 36b. Thus, the first movable roof panel 37a is attached to one side portion of the roof panel 29, and the second movable roof panel 37b is attached to the other side portion of the roof panel 29. The movable roof panels 37a and 37b are moved to their stored positions where they are hanged from the upper frame 24 as shown in FIG. 11, and moved to their deployed positions where they extend laterally from the upper frame 24 so as to become continuous with the roof panel 29 as shown in FIGS. 7 to 9. When the movable roof panels 37a and 37b reach their stored positions, the side faces of the shelter main body 20 are covered with the movable roof panels 37a and 37b. The movable roof panels 37a and 37b are rectangular, and pivot about respective center lines extending in a longitudinal direction of the shelter 10.

As shown in FIG. 11, a first movable floor panel 41a is positioned on the inside of the movable roof panel 37a, and pivotally attached to one side portion of the floor panel 28 via a hinge 38a. The movable floor panel 41a is rectangular, and one side portion of the movable floor panel 41a is coupled to the floor panel 28 via the hinge 38a. A rectangular first movable side panel 42a is pivotally attached to the other side portion, namely, a free end of the movable floor panel 41a via a hinge 39a. The movable floor panel 41a is moved to a stored position where it is oriented in a vertical direction as shown in FIG. 11, and a deployed position where it extends horizontally laterally from the lower frame 21 so as to become continuous with the floor panel 28 as shown in FIGS. 7 to 9. When the movable floor panel 41a reaches the stored position, the movable side panel 42a is folded and stacked on an inner face of the movable floor panel 41a. When the movable roof panel 37a and the movable floor panel 41a are in the deployed positions, the movable side panel 42a is pivoted to a deployed position and erected upward.

As shown in FIG. 11, a second movable floor panel 41b is positioned on the inside of the movable roof panel 37b, and pivotally attached to the other side portion of the floor panel 28 via a hinge 38b. One side portion of the movable floor panel 41b is coupled to the floor panel 28 via the hinge 38b as well as the movable floor panel 41a. A rectangular second movable side panel 42b is pivotally attached to the other side portion, namely, a free end of the movable floor panel 41b via a hinge 39b. The movable floor panel 41b is moved to a stored position where it is oriented in a vertical direction as shown in FIG. 11, and a deployed position where it extends horizontally laterally from the lower frame 21 so as to become continuous with the floor panel 28 as shown in FIGS. 7 to 9. When the movable floor panel 41b is in the stored position, the movable side panel 42b is in a folded state where it is folded and stacked on an inner face of the movable floor panel 41b. When the movable roof panel 37b and the movable floor panel 41b are in the deployed states, the movable side panel 42b is pivoted to the deployed position and erected upward. The movable floor panels 41a and 41b and the movable side panels 42a and 42b are pivoted about a center line extending in the longitudinal direction of the shelter 10.

Figure 10:
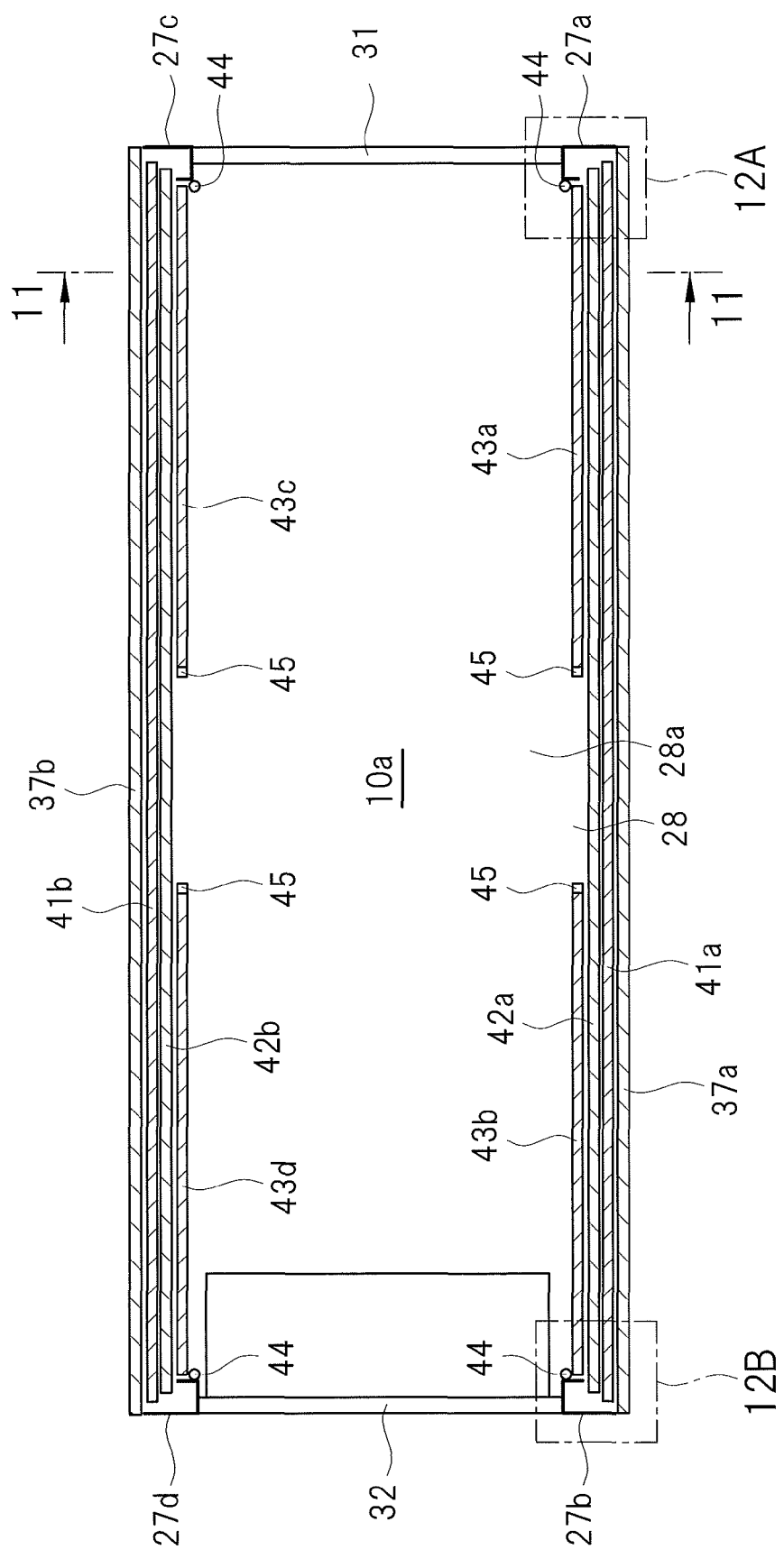
FIG. 10 is an enlarged sectional view taken along a line 10-10 in FIG. 1.

As shown in FIG. 10, four movable end panels 43a to 43d are disposed in the shelter main body 20. As shown in FIG. 11, a base end portion of the movable end panel 43a is attached to the pole 27a via a hinge pin 44 attached to the pole 27a so as to extend in the vertical direction. Therefore, the movable end panel 43a can be pivoted about the hinge pin 44 in a horizontal direction within the range of about 90 degrees. The movable end panel 43a is moved to a stored position where it extends along the side face of the shelter main body 20 in the longitudinal direction as shown in FIGS. 10 and 11, and a deployed position where it extends in a widthwise direction of the shelter 10 as shown in FIGS. 7 to 9. As shown in FIGS. 10 and 11, the movable end panel 43c is pivotally attached to the pole 27c via a hinge pin 44 attached to the pole 27c so as to extend in the vertical direction.

As shown in FIG. 10, the movable end panel 43b is pivotally attached to the pole 27b, and the movable end panel 43d is pivotally attached to the pole 27d. The movable end panels 43b to 43d are respectively moved between the stored positions where they extend in the longitudinal direction of the shelter 10 and the deployed position where they extend in the widthwise direction of the shelter 10 as well as the movable end panel 43a. Two movable end panels 43a and 43b are disposed on one side portion of the shelter main body 20, while the other two movable end panels 43c and 43d are disposed on the other side portion of the shelter main body 20. When the movable end panels 43a to 43d reach the deployed positions, they form an internal space 10a in the shelter main body 20 in cooperation with the other movable panels.

Water-tightness seal members 45 such as rubber are provided on respective upper faces, lower faces, and distal end faces of the movable end panels 43a to 43d in an elastically-deformable fashion.

Figure 12A:
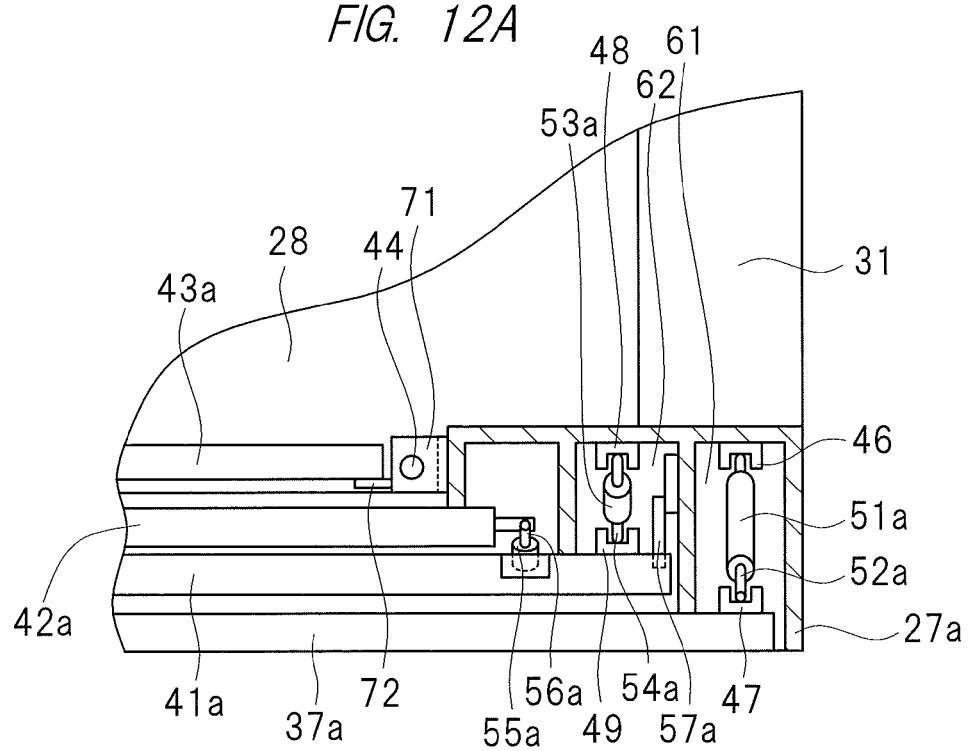
FIG. 12A is an enlarged sectional view showing a portion indicated by the reference character "12A" in FIG. 10.
Figure 12B:
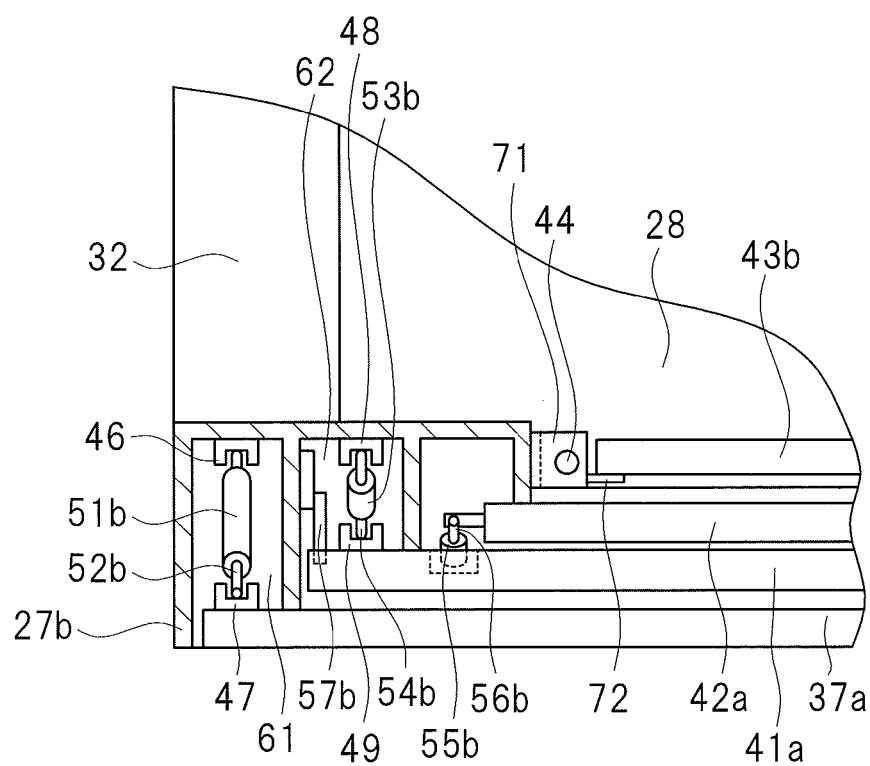
FIG. 12B is an enlarged sectional view showing a portion indicated by the reference character "12B" in FIG. 10.

As shown in FIGS. 7 to 9, an actuator 51a is pivotally attached to a lower end portion of the pole 27a in order to drive the movable roof panel 37a about the hinge 36a to open and close it, and a plunger 52a of this actuator 51a is connected to a front end portion of the movable roof panel 37a via a pin. An actuator 51b is pivotally attached to a lower end portion of the pole 27b, and a plunger 52b of this actuator 51b is connected to a rear end portion of the movable roof panel 37a via a pin. As shown in FIG. 12A, a base end portion of the actuator 51a is connected, via a pin, to a bracket 46 fixed to a lower end portion of the pole 27a, and a distal end portion of the plunger 52a is connected, via a pin, to a bracket 47 fixed to the movable roof panel 37a. Similarly, as shown in FIG. 12B, a base end portion of the actuator 51b is connected, via a pin, to a bracket 46 fixed to a lower end portion of the pole 27b, and a distal end portion of the plunger 52b is connected, via a pin, to a bracket 47 fixed to the movable roof panel 37a. The plungers 52a and 52b are respectively moved so as to advance and retreat in axial directions thereof by hydraulic pressures supplied to hydraulic chambers in the actuators 51a and 51b. Therefore, the first movable roof panel 37a is pivoted by two front and rear actuators 51a and 51b.

As shown in FIG. 7, an actuator 51c is pivotally attached to a lower end portion of the pole 27c in order to drive the movable roof panel 37b about the hinge 36b to open and close it, and a plunger 52c of this actuator 51c is connected to a front end portion of the movable roof panel 37b via a pin. As shown in FIG. 8, an actuator 51d is pivotally attached to a lower end portion of the pole 27d, and a plunger 52d of this actuator 51d is connected to a rear end portion of the movable roof panel 37 via a pin. Base end portions of the respective actuators 51c and 51d are respectively connected, via pins, to brackets (not shown) fixed to lower end portions of the poles 27c and 27d, and distal end portions of the plungers 52c and 52d are respectively connected, via pins, to brackets (not shown) fixed to the movable roof panel 37a. The plungers 52c and 52d are respectively moved so as to advance and retreat in axial directions thereof by hydraulic pressures supplied to hydraulic chambers in the actuators 51c and 51d. Therefore, the second movable roof panel 37b is pivoted by two front and rear actuators 51c and 51d.

As shown in FIG. 7, an actuator 53a is pivotally attached to an upper end portion of the pole 27a in order to drive the movable floor panel 41a about the hinge 38a to open and close it, and a plunger 54a of this actuator 53a is connected to a front end portion of the movable floor panel 41a via a pin. As shown in FIG. 8, an actuator 53b is pivotally attached to an upper end portion of the pole 27b, and a plunger 54b of this actuator 53b is connected to a rear end portion of the movable floor panel 41a via a pin. As shown in FIG. 12A, a base end portion of the actuator 53a is connected, via a pin, to a bracket 48 fixed to an upper end portion of the pole 27a, and a distal end portion of the plunger 54a is connected, via a pin, to a bracket 49 fixed to the movable floor panel 41a. Similarly, as shown in FIG. 12B, a base end portion of the hydraulic cylinder 53b is connected, via a pin, to a bracket 48 fixed to an upper end portion of the pole 27b, and a distal end portion of the plunger 54b is connected, via a pin, to a bracket 49 fixed to the movable floor panel 41a. The plungers 54a and 54b are respectively moved so as to advance and retreat in axial directions thereof by hydraulic pressures supplied to hydraulic chambers within the actuators 53a and 53b. Therefore, the first movable floor panel 41a is pivoted by two front and rear actuators 53a and 53b.

As shown in FIG. 7, an actuator 53c is pivotally attached to an upper end portion of the pole 27c in order to drive the movable floor panel 41b about the hinge 38b to open and close it, and a plunger 54c of this actuator 53c is connected to a front end portion of the movable floor panel 41b via a pin. As shown in FIG. 8, an actuator 53d is pivotally attached to an upper end portion of the pole 27d, and a plunger 54d of this actuator 53d is connected to a rear end portion of the movable floor panel 41b via a pin. Base end portions of the actuators 53c and 53d are respectively connected, via pins, to brackets (not shown) fixed to upper end portions of the poles 27c and 27d, and distal end portions of the plungers 54c and 54d are connected, via pins, to brackets (not shown) fixed to an upper end portion of the movable floor panel 41b. The plungers 54c and 54d are respectively moved so as to advance and retreat in axial directions thereof by hydraulic pressures supplied to hydraulic chambers in the actuators 53c and 53d. Therefore, the second movable floor panel 41b is pivoted by two front and rear actuators 53c and 53d.

As shown in FIG. 7, an actuator 55a is pivotally attached to a distal end portion of the movable floor panel 41a in order to drive the movable side panel 42a about the hinge 39a to open and close it, and a plunger 56a of this actuator 55a is connected to the movable side panel 42a via a pin. As shown in FIG. 8, an actuator 55b is pivotally attached to a rear end portion of the movable floor panel 41a, and a plunger 56b of this actuator 55b is connected to the movable side panel 42a via a pin. The plungers 56a and 56b are respectively moved so as to advance and retreat by hydraulic pressures supplied to hydraulic chambers in the actuators 55a and 55b. Therefore, the first movable side panel 42a is pivoted with respect to the first movable floor panel 41a by two front and rear actuators 55a and 55b.

As shown in FIG. 7, an actuator 55c is pivotally attached to a front end portion of the movable floor panel 41b in order to drive the movable side panel 42b about a hinge 39b to open and close it with respect to the movable side floor panel 41b, and a plunger 56c of this actuator 55c is connected to the movable side panel 42b via a pin. As shown in FIG. 8, an actuator 55d is pivotally attached to a rear end portion of the movable floor panel 41b, and a plunger 56d of this plunger 55d is connected to the movable side panel 42b via a pin. The plungers 56c and 56d are respectively moved so as to advance and retreat by hydraulic pressures supplied to hydraulic chambers in the actuators 55c and 55d. Therefore, the second movable side panel 42b is pivoted with respect to the second movable floor panel 41b by two front and rear actuators 55c and 55d.

All of the actuators are hydraulic cylinders each for driving a plunger by a hydraulic pressure supplied from an external hydraulic pump.

In order to support the deployed movable floor panel 41a, as shown in FIG. 7, a link mechanism 57a is provided between the pole 27a and a front end portion of the movable floor panel 41a. This link mechanism 57a has: a link piece 58a connected to the movable floor panel 41a via a pin; and a link piece 59a connected to the pole 27a via a pin, and the link pieces 58a and 59a are connected to each other via a pin. As shown in FIG. 8, a link mechanism 57b is provided between the pole 27b and a rear end portion of the movable floor panel 41a. The link mechanism 57b has: a link piece 58b connected to the movable floor panel 41a via pin; and a link piece 59b connected to the pole 27b via a pin, and the link pieces 58b and 59b are connected to each other via a pin. When the movable floor panel 41a reaches a stored state, the link mechanisms 57a and 57b are folded, and when the movable floor panel 41a reaches a deployed state, the link mechanisms 57a and 57b hold the movable floor panel 41a in a horizontal state.

In order to support the deployed movable floor panel 41b, as shown in FIG. 7, a link mechanism 57c is provided between the pole 27c and a front end portion of the movable floor panel 41b. This link mechanism 57c has: a link piece 58c connected to the movable floor panel 41b via a pin; and a link piece 59c connected to the pole 27c via a pin, and the link pieces 58c and 59c are connected to each other via a pin. As shown in FIG. 8, a link mechanism 57d is provided between the pole 27d and a rear end portion of the movable floor panel 41b. This link mechanism 57d has: a link piece 58d connected to the movable floor panel 41b via a pin; and a link piece 59d connected to the pole 27d via a pin, and the link pieces 58d and 59d are connected to each other via a pin. When the movable floor panel 41b reaches a stored state, the link mechanisms 57c and 57d are folded, and when the movable floor panel 41b reaches a deployed state, the link mechanism 57c and 57d hold the movable floor panel 41b in a horizontal state.

As shown in FIG. 12, the poles 27a and 27b are respectively provided with housing chambers 61 and 62, and when the movable roof panel 37a, the movable floor panel 41a, and the movable side panel 42a reach stored states, the actuators 51a and 51b are housed in the housing chamber 61, and the actuators 53a and 53b are housed in the housing chamber 62. Similarly, the poles 27c and 27d are respectively provided with: a housing chamber (not shown) in which the actuators 51c and 51b are housed; and a housing chamber (not shown) in which the actuators 53c and 53d are housed.

Figure 13:
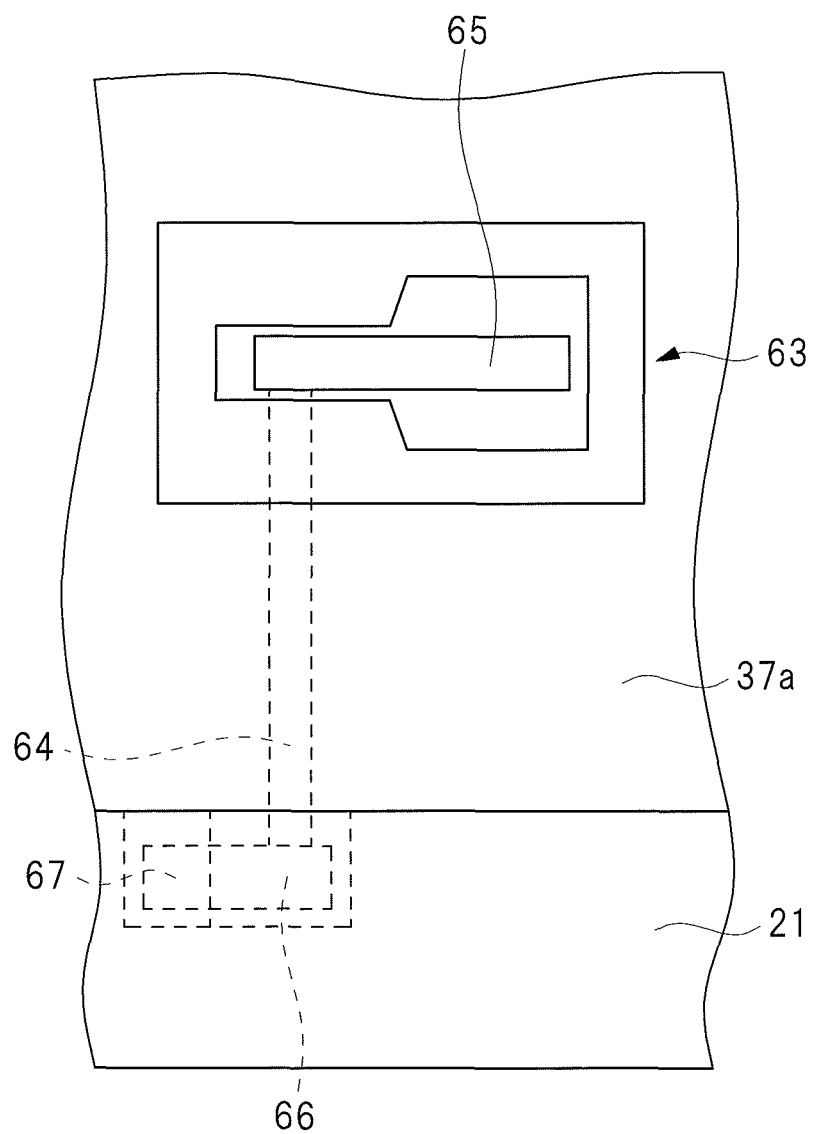
FIG. 13 is an enlarged sectional view showing a portion indicated by the reference character "13" in FIG. 1.

As shown in FIG. 1, lock mechanisms 63 for holding the movable roof panel 37a in a closed state are respectively provided to a front side portion and a rear side portion of the movable roof panel 37a. Similar lock mechanisms 63 are also provided to the other movable roof panel 37b. FIG. 13 is an enlarged view showing the lock mechanism 63, and the lock mechanism 63 has a rotation shaft 64 pivotally provided to the movable roof panel 37a. An operation lever 65 is attached to one end portion of the rotation shaft 64, and an engagement member 66 is attached to the other end portion of the rotation shaft 64. This engagement member 66 is engaged with an engagement member 67 provided to the lower frame 21 of the floor panel 28. When the movable roof panel 37a is engaged with the lower frame 21 under the condition that the movable roof panel 37a is in a stored state, the engagement member 66 is engaged with the engagement member 67 by the operation lever 65. On the other hand, when the movable roof panel 37a is disengaged from the lower frame 21, an operator operates the operation lever 65 so that the engagement members 66 and 67 are disengaged from each other.

Figure 3:
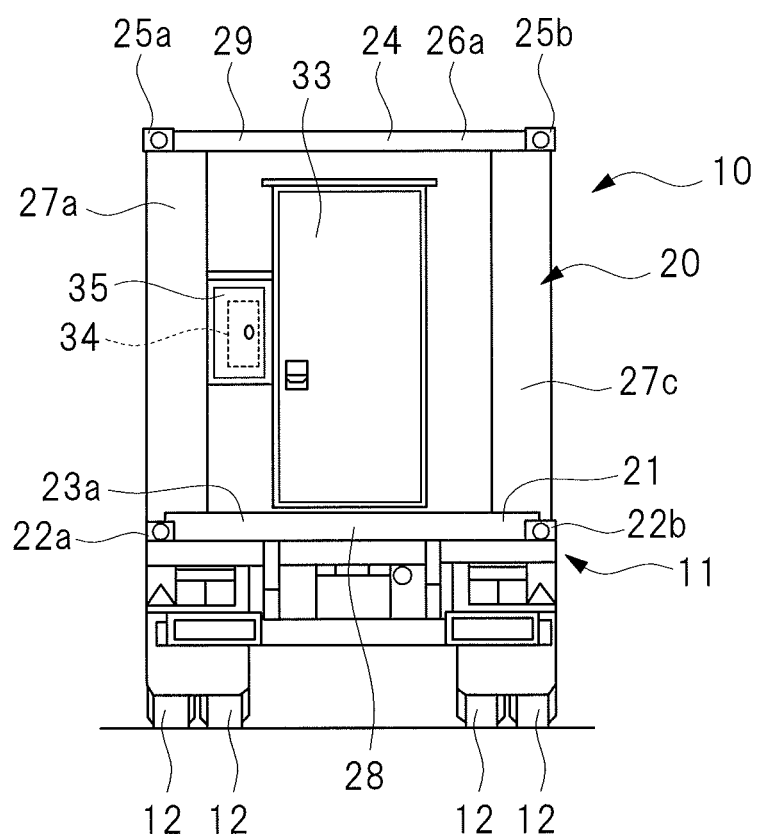
FIG. 3 is a front view of the trailer shown in FIG. 1.
Figure 4:
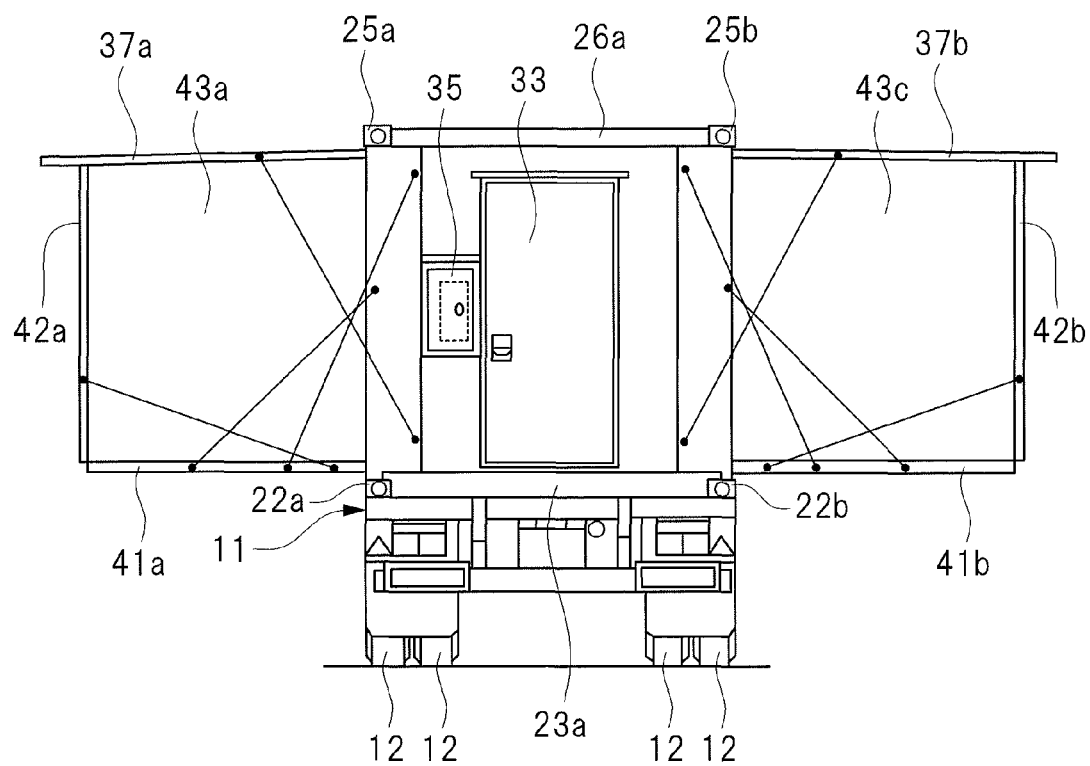
FIG. 4 is a front view showing the deployed state of the deployment shelter loaded on the trailer.
Figure 5:
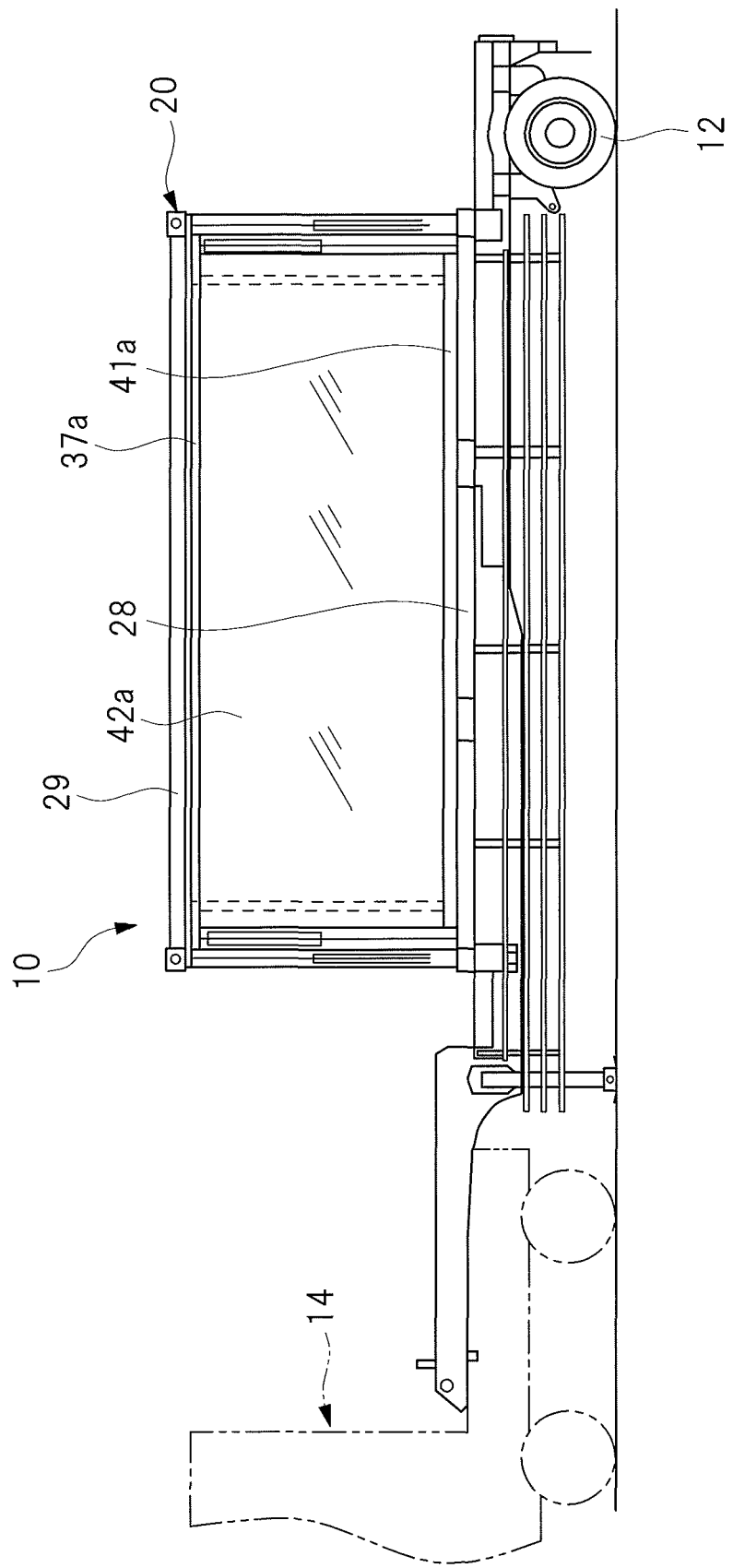
FIG. 5 is a side view showing the deployed state of the deployment shelter loaded on the trailer.

An operation procedure for the shelter 10 from the stored state shown in FIGS. 1 to 3 to the deployed state shown in FIGS. 4 to 6 will be explained hereinafter.

FIGS. 14 to 19 show an operation procedure for deploying the movable roof panel 37a, the movable floor panel 41a, the movable side panel 42a, and the movable end panels 43a and 43b provided on one side of the shelter 10.

Figure 14:
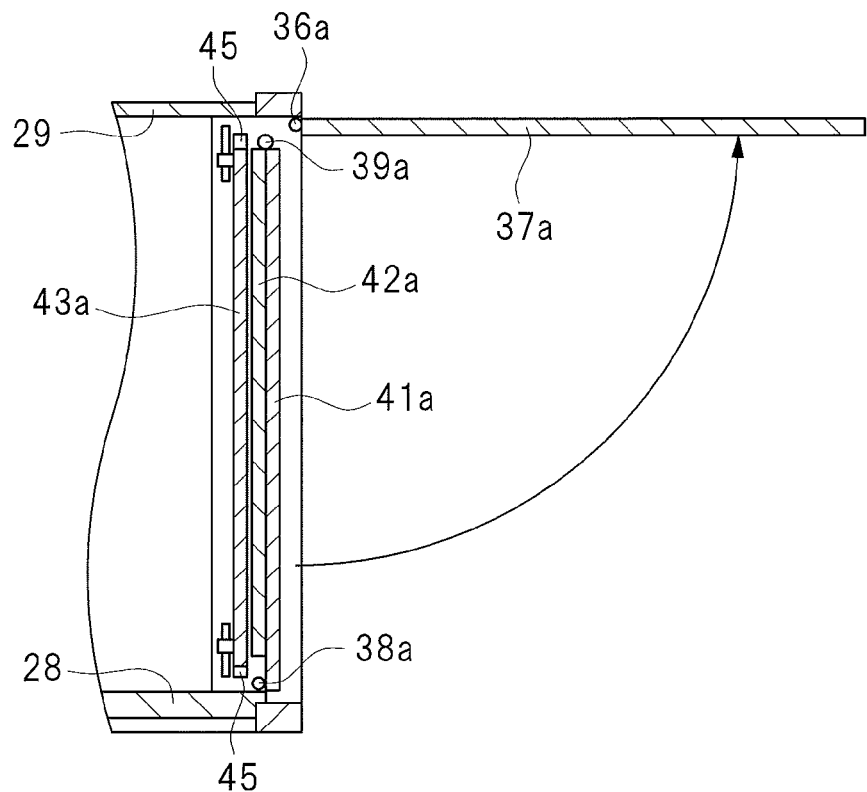
FIG. 14 is a cross sectional view showing a state where the movable roof panels are pivoted to the standby positions.
Figure 15:
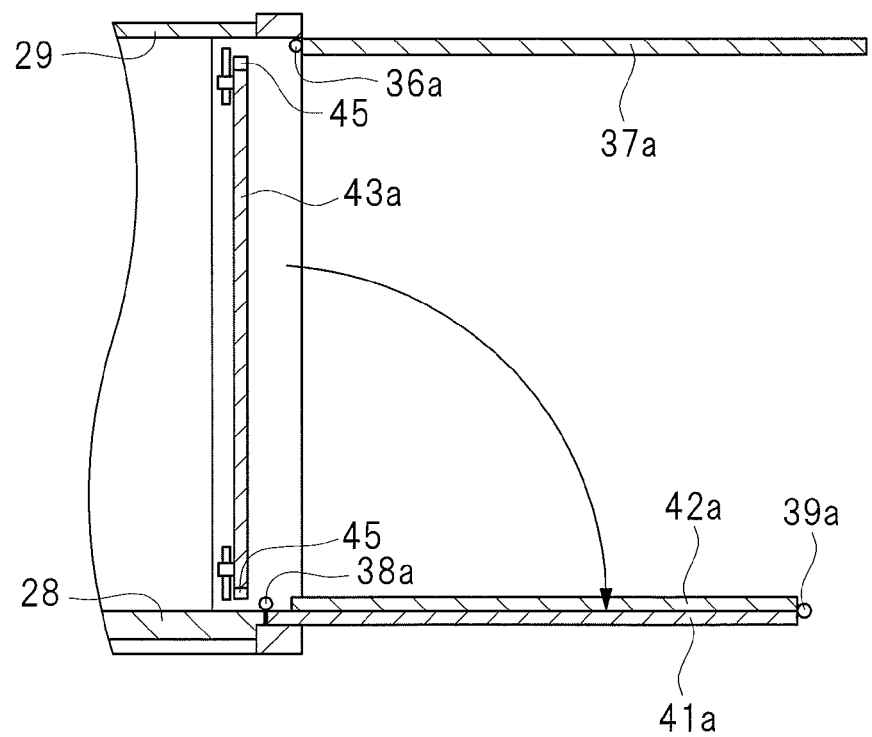
FIG. 15 is a cross sectional view showing a state where the movable floor panels are pivoted to the deployed positions.
Figure 16:
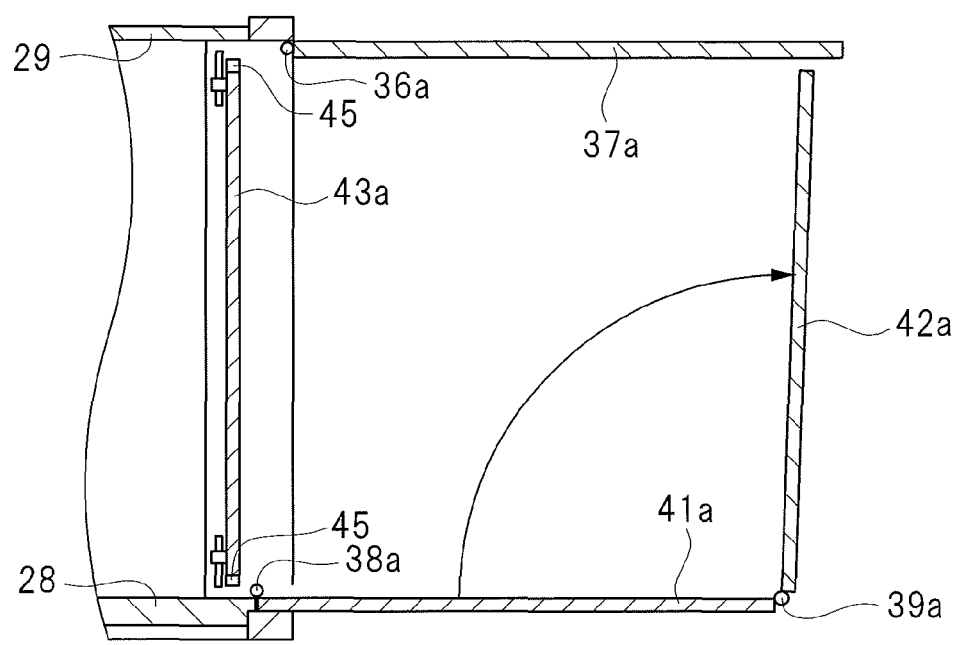
FIG. 16 is a cross sectional view showing a state where the movable side panels are pivoted to the standby positions.

When the actuators 51a and 51b are driven after the operation lever 65 is operated so that the movable roof panel 37a is disengaged from the floor panel 28, the movable roof panel 37a is pivoted about the hinge 36a up to a standby position beyond the deployed position. FIG. 14 shows a state where the movable roof panel 37a is driven up to the standby position. Then, when the actuators 53a and 53b are driven, the movable floor panel 41a is pivoted about the hinge 38a up to the deployed position. At this time, since the movable side panel 42a is coupled to the movable floor panel 41a via the hinge 39a, the movable side panel 42a and the movable floor panel 41a is pivoted up to the deployed position of the movable floor panel 41a. FIG. 15 shows a state where the movable floor panel 41a reaches the deployed position. When the movable floor panel 41a reaches the deployed position, an upper face of the movable floor panel 41a becomes flush with an upper face of the floor panel 28. Then, when the actuators 55a and 55b are driven, the movable side panel 42a is pivoted about the hinge 39a up to a standby position beyond the deployed position. FIG. 16 shows a state where the movable side panel 42a reaches the standby position.

Figure 17:
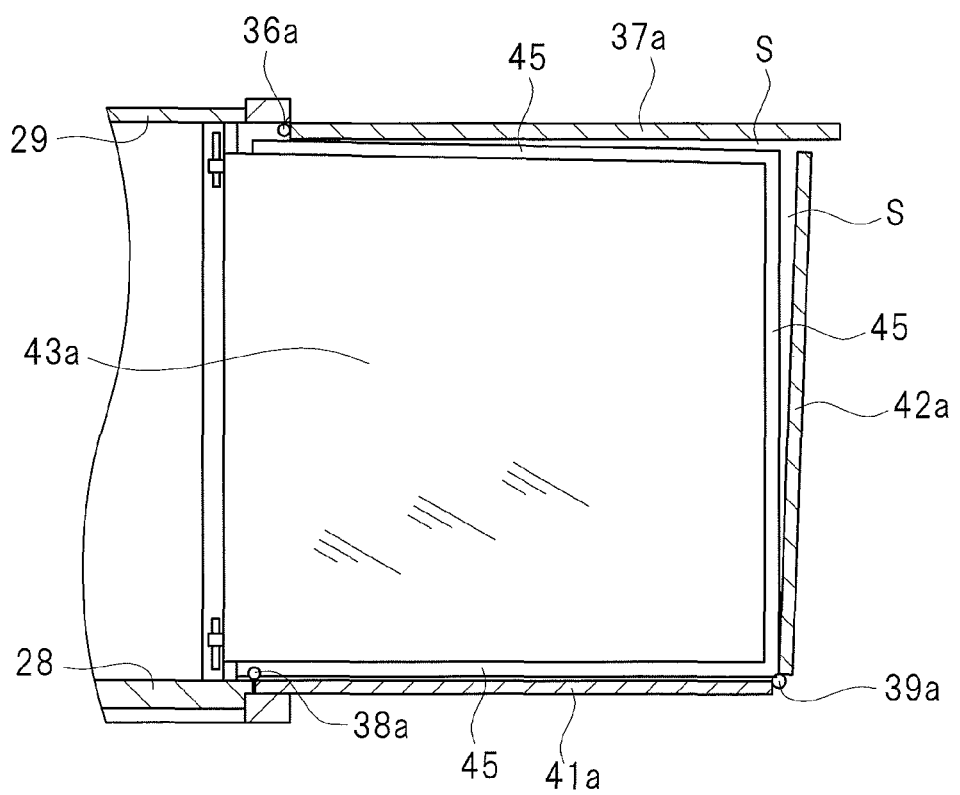
FIG. 17 is a cross sectional view showing a state where the movable end panels are operated and pivoted to the deployed positions.
Figure 18:
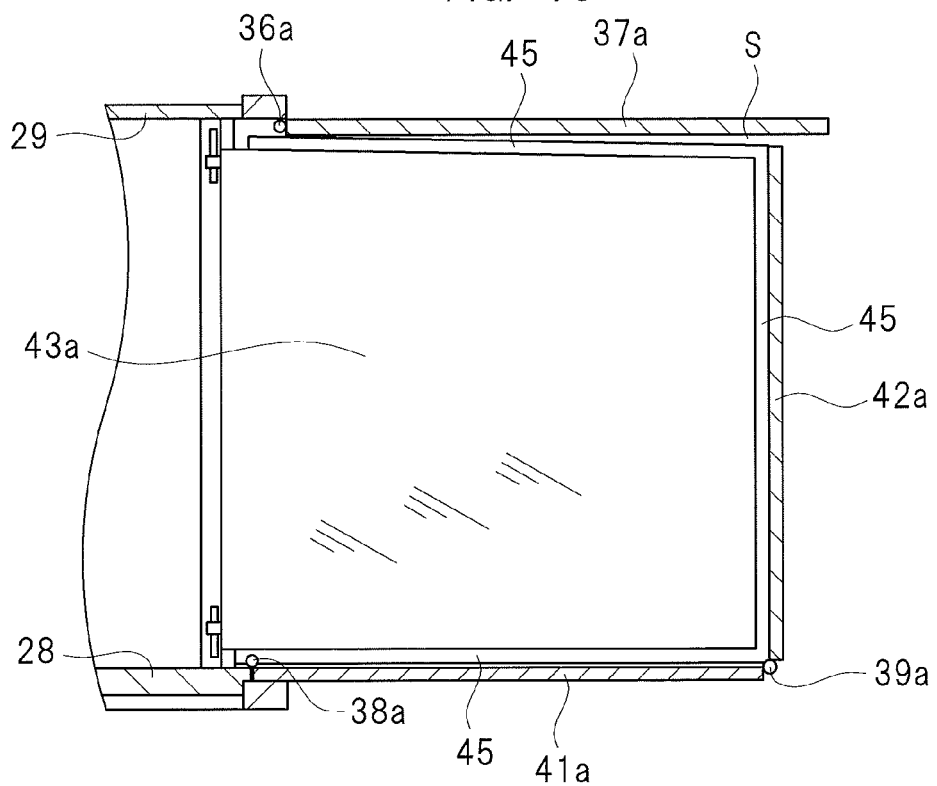
FIG. 18 is a cross sectional view showing a state where the movable side panels are restored to the deployed positions from the standby positions.
Figure 19:
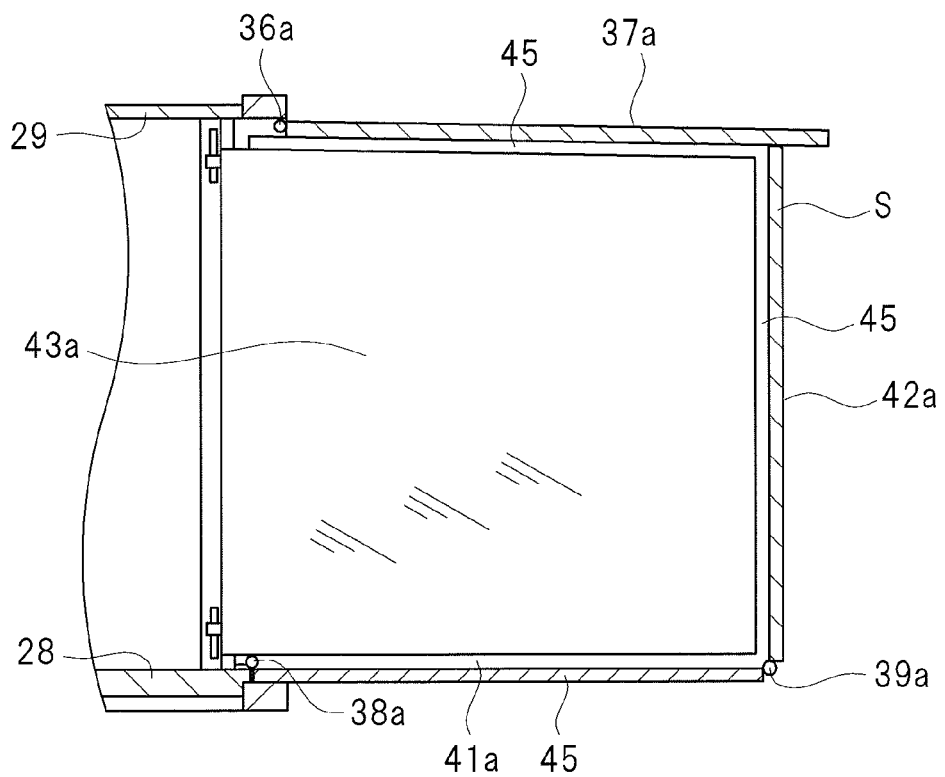
FIG. 19 is a cross sectional view showing a state where the movable roof panels are restored to the deployed positions from the standby positions.

In this state, the front and rear movable end panels 43a and 43b are pivoted up to the deployed positions by manual operation of the operator. FIG. 17 shows the movable end panel 43a which is pivoted from the stored position to the deployed position. At this time, since the movable roof panel 37a and the movable side panel 42a are pivoted to advance to angles larger than the angles of their deployed positions, clearances "S" are formed between the movable end panels 43a and 43b and the movable roof panel 37a, as shown in FIG. 17. Therefore, when the movable end panels 43a and 43b are pivoted by the manual operation, rotational resistances acting on the movable end panels 43a and 43b become small, so that rotational operations of the movable end panels 43a and 43b can be performed easily. Next, the movable side panel 42a is driven by the actuators 55a and 55b to be returned to the deployed position as shown in FIG. 18. Therefore, the movable side panel 42a abuts on the movable end panels 43a and 43b. The movable roof panel 37a is returned to the deployed position by the actuators 51a and 51b in this state, as shown in FIG. 19. Therefore, the movable roof panel 37a abuts on the movable end panels 43a and 43b.

The movable roof panel 37b, the movable floor panel 41b, the movable side panel 42b, and the movable end panels 43c and 43d provided on the other side of the shelter 10 are also operated so as to move from the stored positions to the deployed positions on the basis of the similar procedure. FIG. 20 shows that all the movable panels are in the deployed state. When the shelter 10 is operated so as to change from the deployed state to the stored state, a reverse procedure from the above procedure is performed.

Figure 21A:
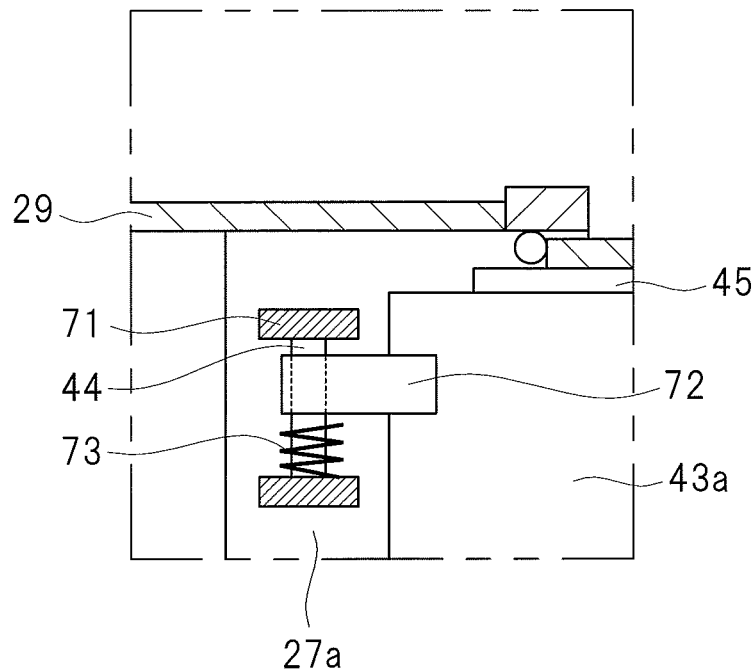
FIG. 21A is an enlarged sectional view of a portion indicated by the reference character "21A" in FIG. 20.
Figure 21B:
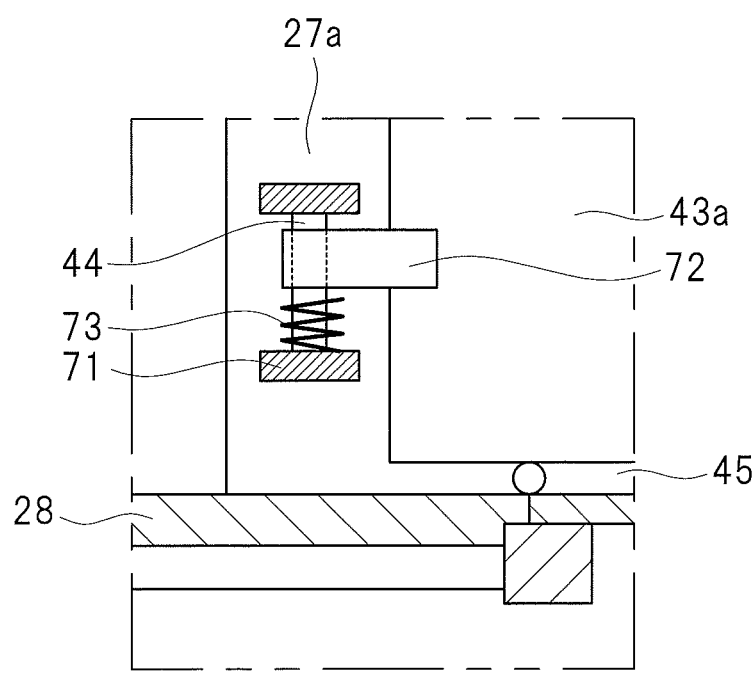
FIG. 21B is an enlarged sectional view of a portion indicated by the reference character "21B" in FIG. 20.

FIG. 21A is an enlarged sectional view of a portion indicated by the reference character "21A" in FIG. 20. FIG. 21B is an enlarged sectional view of a portion indicated by the reference character "21B" in FIG. 20.

Hinge pins 44 are attached to respective support brackets 71 fixed to the pole 27a. A hinge bracket 72 fixed to the movable end panel 43a is attached to the hinge pin 44 and movable in a vertical direction. A compression coil spring 73 is attached to the hinge pin 44 as a spring member, and an upward elastic force is supplied to the movable end panel 43a by the compression coil spring 73. Therefore, when the movable end panel 43a is pivoted from the stored position to the deployed position by manual operation, a resistance force acting on the movable end panel 43a becomes small, so that rotational operation of the movable end panel 43a can be performed easily with a small operation force. Furthermore, as shown in FIG. 19, when the movable roof panel 37a is returned from the standby position to the deployed position, the movable end panel 43a is positioned at an intermediate position in a vertical direction by the spring force of the compression coil spring 73. Therefore, the water-tightness seal member 45 between the movable roof panel 37a and the movable end panel 43a and the water-tightness seal member 45 between the movable floor panel 41a and the movable end panel 43a are respectively subjected to compression forces similar to each other to seal the movable end panel 43a. The other movable end panels 43b to 43d are also attached to the poles by hinge pins 44 each having a similar structure.

Figure 22:
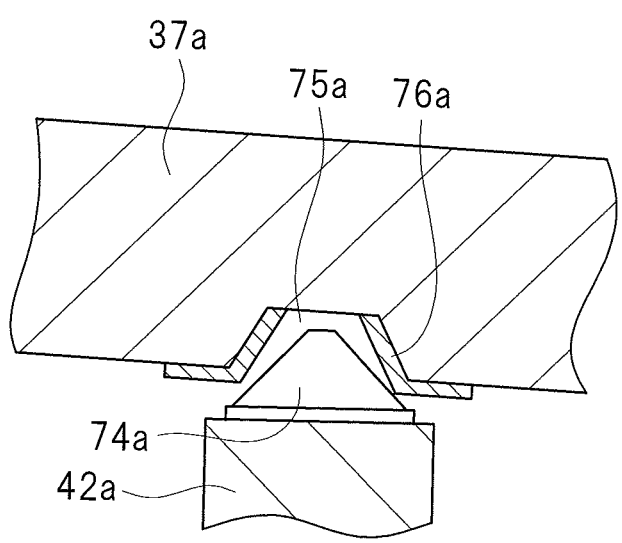
FIG. 22 is an enlarged sectional view of a portion indicated by the reference character "22" in FIG. 20.

FIG. 22 is an enlarged sectional view of a portion indicated by a reference character "22" in FIG. 20. A protrusion 74a is provided on a distal end face of the movable side panel 42a, and the movable roof panel 37a is provided with a recessed portion 75a corresponding to the protrusion 74a. A receiving member 76b which the protrusion 74b enters is attached to the recessed portion 75b. Therefore, when the movable roof panel 37a is moved from the standby position to the deployed position, the protrusion 74b enters the receiving member 76b, and the movable side panel 42a is positioned on the movable roof panel 37a. The other movable side panels 42b to 42d are also positioned on the movable roof panel 37b by similar positioning mechanisms.

Figure 23:
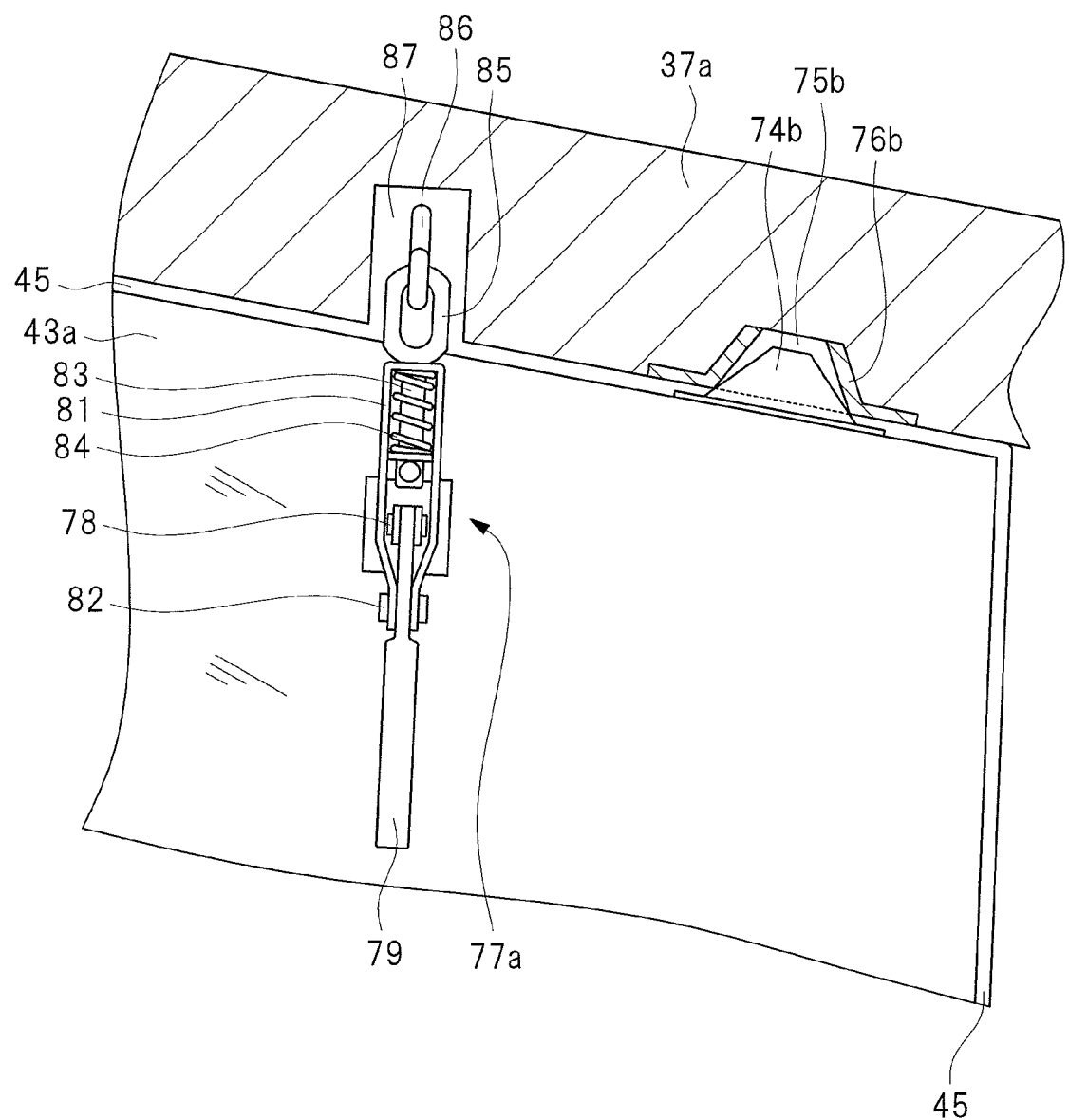
FIG. 23 is an enlarged sectional view of a portion indicated by the reference character "23" in FIG. 20.

FIG. 23 is an enlarged sectional view of a portion indicated by the reference character "23" in FIG. 20. A protrusion 74b is provided on an upper face of the movable end panel 43a, and the movable roof panel 37a is provided with a recessed portion 75b corresponding to the protrusion 74b. A receiving member 76b which the protrusion 74b enters is attached to the recessed portion 75b. Therefore, when the movable roof panel 37a is moved from the standby position to the deployed position, the protrusion 74b enters the receiving member 76b, and the movable end panel 43a is positioned on the movable roof panel 37a. The other movable end panels 43b to 43d are also positioned on the movable roof panels by similar positioning mechanisms.

As shown in FIG. 23, the movable end panel 43a is provided with a lock mechanism 77a for fastening the movable end panel 43a to the movable roof panel 37a. The lock mechanism 77a has a lock handle 79 pivotally provided to a support pin 78 attached to the movable end panel 43a, and a spring case 81 is pivotally attached to the lock handle 79 by a coupling pin 82. A rod 83 is attached to the spring case 81 and movable in its axial direction, and a compression coil spring 84 is attached to the rod 83. A ring 85 is attached to a distal end of the rod 83, and a hook 86 which is engaged with the ring 85 is attached in a recessed portion 87 provided to the movable roof panel 37a. When the ring 85 is engaged with the hook 86, the movable roof panel 37a is prevented from being lifted from the movable end panel 43a. On the other hand, when the lock handle 79 is operated so that the ring 85 is disengaged from the hook 86, the movable roof panel 37a can be moved from the deployed position to the standby position. The other movable end panels 43b to 43d are also provided with similar lock mechanisms 77a.

Figure 24:
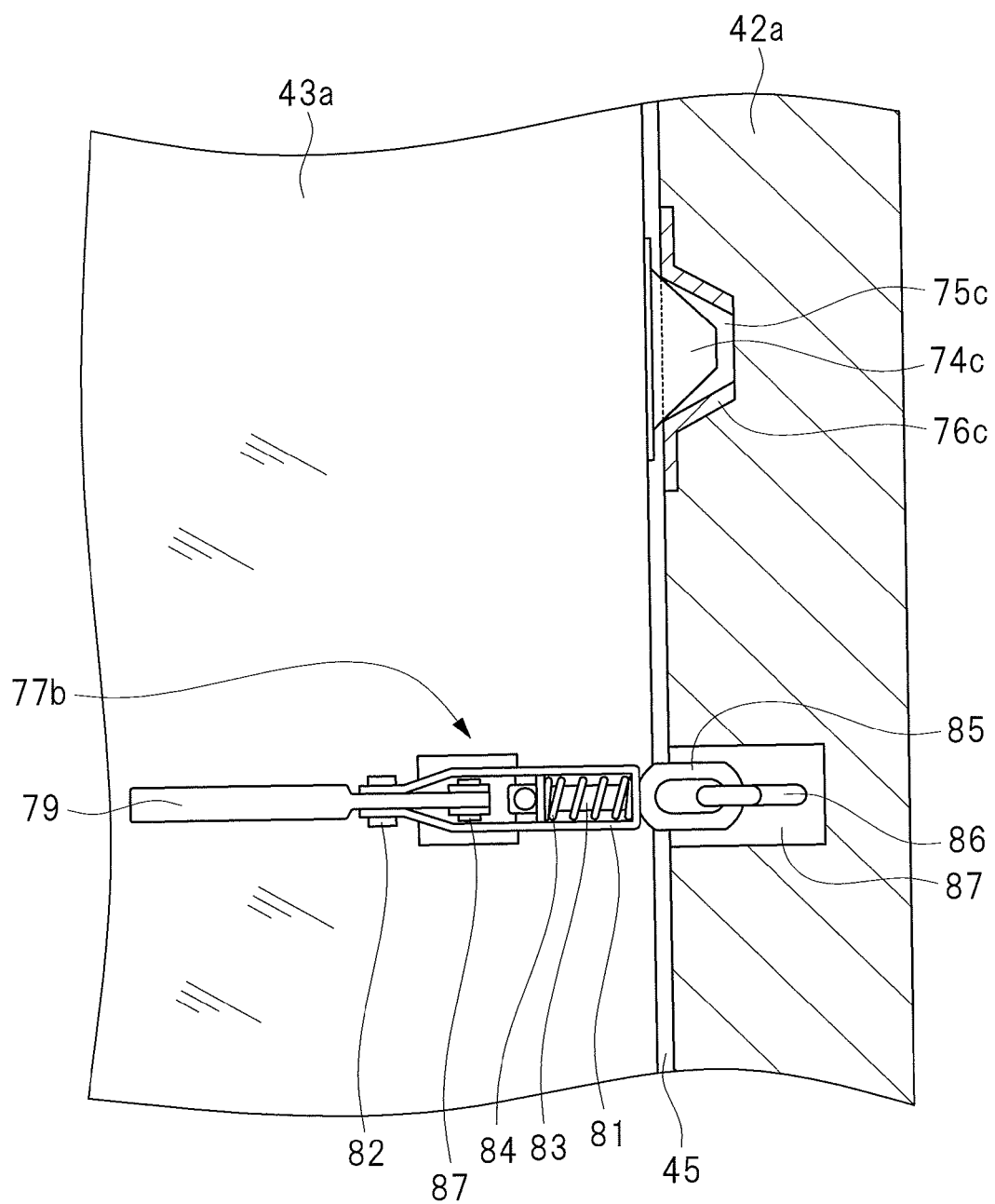
FIG. 24 is an enlarged sectional view of a portion indicated by the reference character "24" in FIG. 20.

FIG. 24 is an enlarged sectional view of a portion indicated by the reference character "24" in FIG. 20. A protrusion 74c is provided on a distal end face of the movable end panel 43a, and the movable side panel 42a is provided with a recessed portion 75c corresponding to the protrusion 74c. A receiving member 76c which the protrusion 74c enters is attached to the recessed portion 75c. Therefore, when the movable side panel 42a is moved from the standby position to the deployed position, the protrusion 74c enters the receiving member 76c, so that the movable end panel 43a is positioned on the movable side panel 42a. The other movable end panels 43b to 43d are also positioned on the movable side panels by similar positioning mechanisms.

As shown in FIG. 24, the movable end panel 43a is provided with a lock mechanism 77b for fastening the movable end panel 43a to the movable side panel 42a. The lock mechanism 77b has a structure similar to that of the lock mechanism 77a. Therefore, when the ring 85 of the lock mechanism 77b is engaged with the hook 86, the movable side panel 42a is fastened to the movable end panel 43a. On the other hand, when the ring 85 is disengaged from the hook 86 by operating the lock handle 79, the movable side panel 42a can be moved from the deployed position to the standby position. The other movable end panels 43b to 43d are also provided with similar lock mechanisms 77b.

Figure 25:
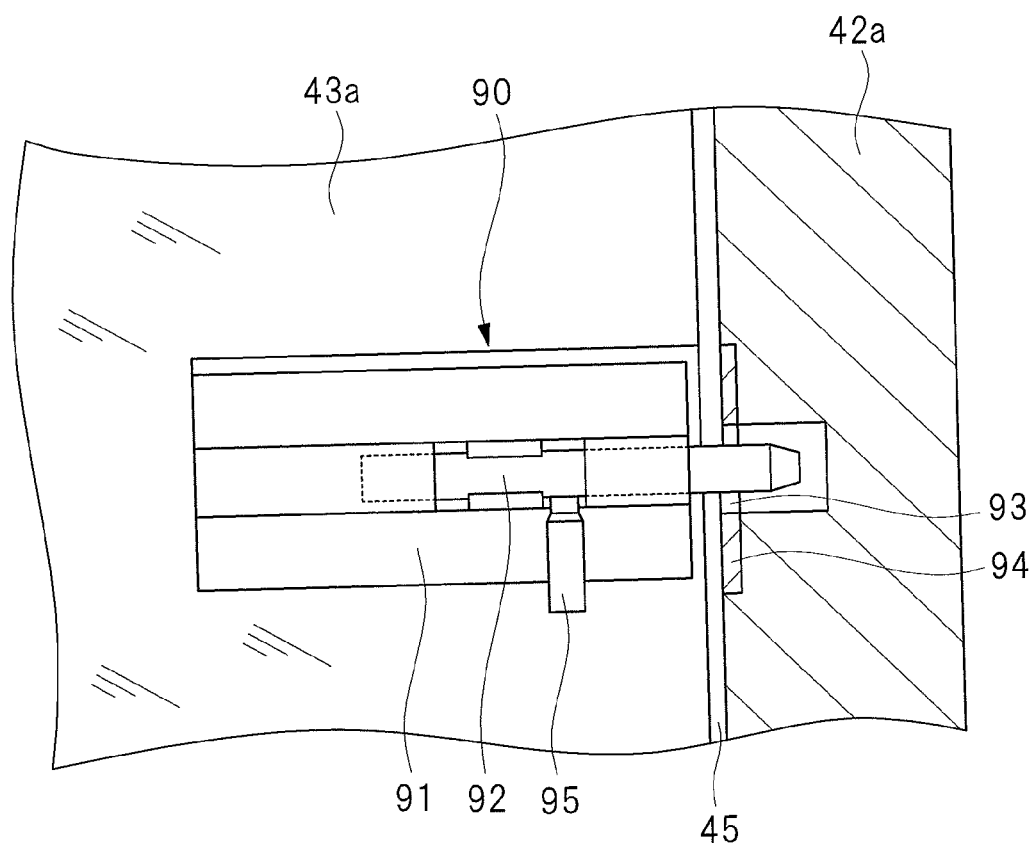
FIG. 25 is a sectional view showing a modification of the locking mechanism.

FIG. 25 shows a modification of the lock mechanism for fastening the movable end panel 43a to the movable side panel 42a. This lock mechanism 90 has a guide member 91 fixed to the movable end panel 43a, and an engagement pin 92 is attached to the guide member 91 and movable in its axial direction. The movable side panel 42a is provided with an engagement plate 94 provided with a through hole 93 corresponding to the engagement pin 92, and the engagement pin 92 enters the through hole 93. The engagement pin 92 is operated by a lock handle 95 provided to the engagement pin 92 so as to move between a position where it is engaged with the engagement plate 94 and a position where it is separated from the engagement plate 94. It may be further provided with this lock mechanism in addition to the above other lock mechanisms.

Figure 26:
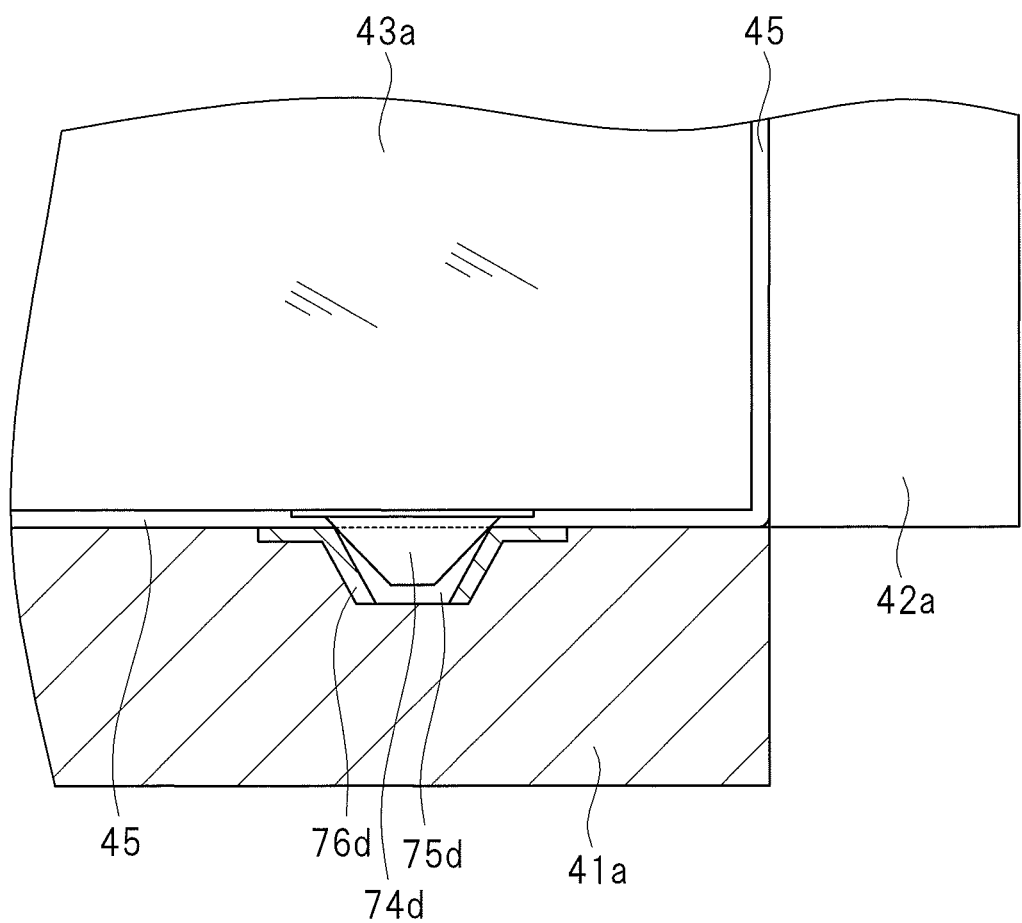
FIG. 26 is an enlarged sectional view of a portion indicated by the reference character "26" in FIG. 20.

FIG. 26 is an enlarged sectional view of a portion indicated by the reference numeral "26" in FIG. 20. A protrusion 74d is provided on a lower face of the movable end panel 43a, and the movable floor panel 41a is provided with a recessed portion 75d corresponding to the protrusion 74d. A receiving member 76d which the protrusion 74d enters is attached to the recessed portion 75d. Therefore, when the movable roof panel 37a is moved from the standby position to the deployed position after the movable end panel 43a is moved and placed in the deployed position, since the movable end panel 43a moves downward, the protrusion 74d enters the receiving member 76d. Therefore, the movable end panel 43a is positioned on the movable floor panel 41a. The other movable end panels 43b to 43d are also positioned to the movable floor panels 41a and 41b by similar positioning mechanisms.

The protrusions 74a to 74d and the recessed portions 75a to 75d may be respectively replaced with each other in concavo-convex relationship, and the movable end panels 43a to 43d may be provided with the recessed portions 75a to 75d.

Figure 2:
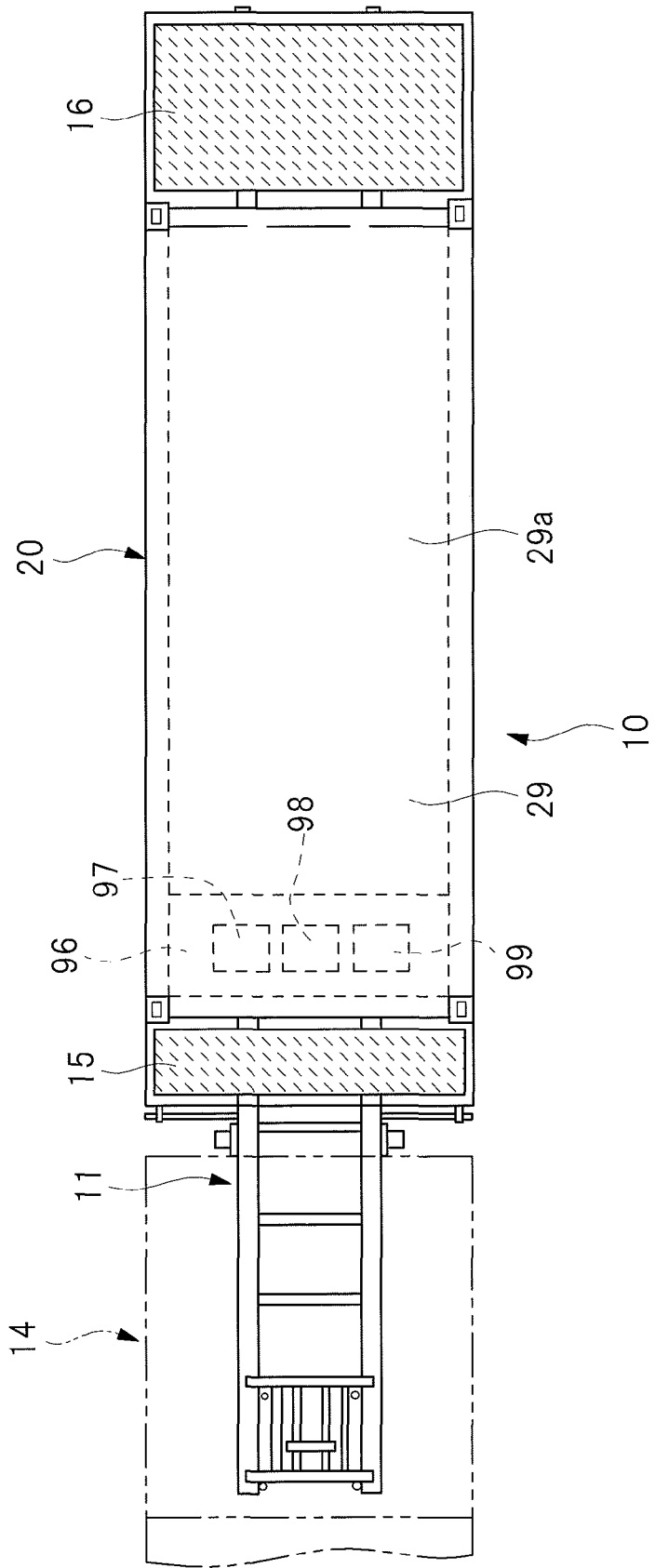
FIG. 2 is a plan view of the trailer shown in FIG. 1.

As shown in FIG. 2, the rear panel 32 is provided with a power chamber 96. An oil pump 97 for supplying hydraulic pressure to the above actuators, an engine 98 for driving the oil pump 97, and a generator 99 for generating electricity by power of the engine 98 are provided in the power chamber 96. Furthermore, a battery (not shown) having accumulated therein electric power generated by the generator 99 is provided in the power chamber 96.

Figure 27:
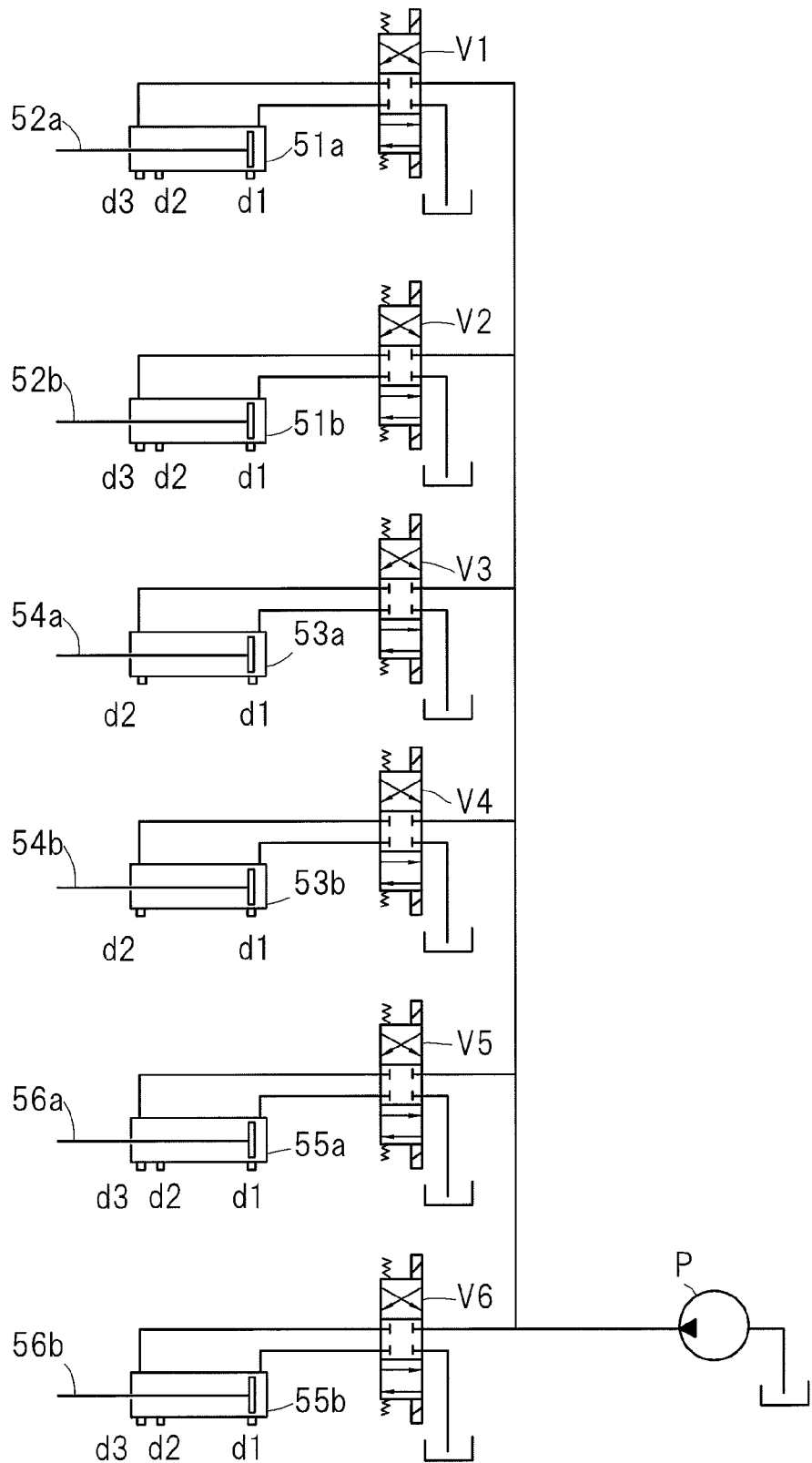
FIG. 27 is a view of a hydraulic circuit for supplying a hydraulic pressure from the hydraulic pump to six actuators for automatically pivoting movable roof panels, movable floor panels, movable side panel provided on one side of the shelter main body.

FIG. 27 is a hydraulic circuit diagram of a hydraulic circuit for supplying hydraulic pressure from a hydraulic pump "P" to six actuators 51a to 55b for automatically pivoting the movable roof panel 37a, the movable floor panel 41a, and the movable side panel 42a provided on one side of the shelter main body 20. Solenoid valves V1 to V6 are provided between the hydraulic pump "P" and the respective actuators. The actuators 51a and 51b for driving the movable roof panel 37a are provided with: position detecting sensors d1 for detecting whether the plungers 52a and 52b reach retreat limit positions, position detecting sensors d2 for detecting whether the plungers 52a and 52b reach the deployed positions, and position detecting sensor d3 for detecting whether the plungers 52a and 52b reach the standby positions. Similarly, the actuators 55a and 55b for driving the movable side panel 42a are provided with position detecting sensors d1 for detecting whether the plungers 56a and 56b reach the retreat limit positions, position detecting sensors d2 for detecting whether the plungers 56a and 56b reach the deployed positions, and position detecting sensors d3 for detecting whether the plungers 56a and 56b reach the standby positions. On the other hand, the actuators 53a and 53b for driving the movable floor panel 41a are provided with position detecting sensors d1 for detecting whether the plungers 54a and 54b reach the retreat limit positions, and position detecting sensors d2 for detecting that the plungers 54a and 54b reach the deployed positions.

However, in the actuators 51a, 51b, 55a, and 55b, only the deployed positions of the plungers may be detected by the position detecting sensors d2, a state where the plungers reach the retreat limit positions, and a state where the plungers reach the advance limit positions, i.e., the standby positions may be detected from pressures in the oil chambers. Similarly, in the actuators 53a and 53b, a state where the plungers reach the advance limit positions, i.e., the deployed positions, and a state where they reach the retreat limit positions may be detected from pressures in the oil chambers.

An operation for supplying hydraulic pressure to the actuators 51c to 55d so as to automatically pivot the movable roof panel 37b, the movable floor panel 41b, and the movable side panel 42b provided on the other side of the shelter main body 20 is controlled by a similar hydraulic circuit diagram.

Figure 28:
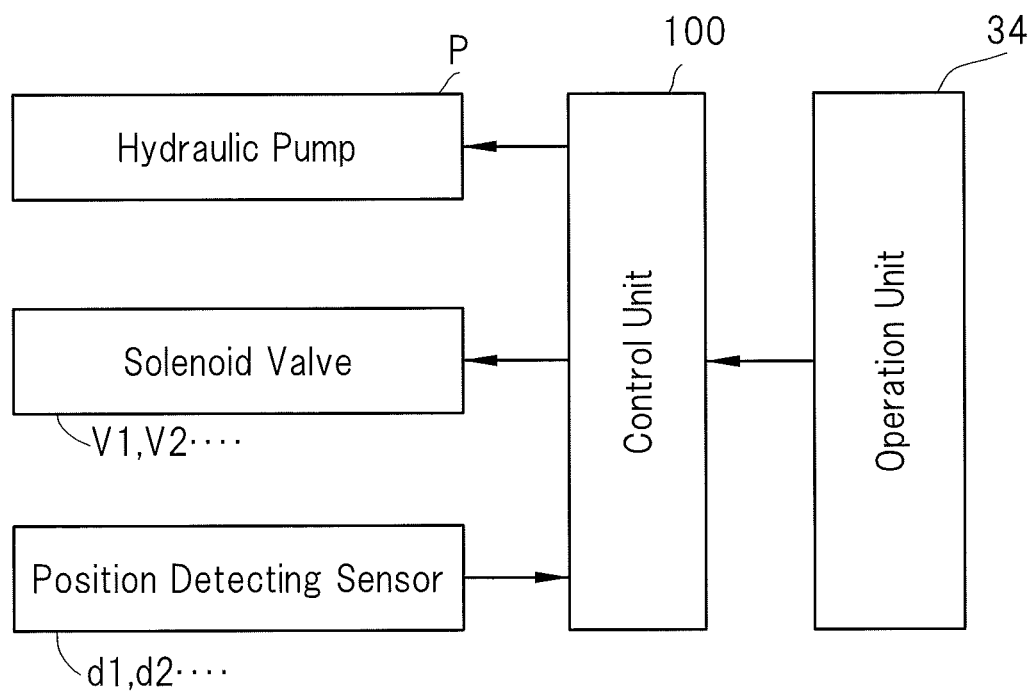
FIG. 28 is a block diagram showing a control circuit for performing an automatic pivotal control of the movable panels by hydraulic pressure from the hydraulic pump.

FIG. 28 is a block diagram showing a control circuit for automatically performing pivoting controls of the movable panels by hydraulic pressure from the hydraulic pump "P". Driving signals for driving the respective actuators are transmitted to the solenoid valves and the hydraulic pump "P" from a control unit 100. Signals are transmitted to the control unit 100 from the position detecting sensors. Commands for driving the movable panels are transmitted to the control unit 100 from an operation unit 34 when an operation switch provided to the operation unit 34 is operated by the operator.

Figure 29:
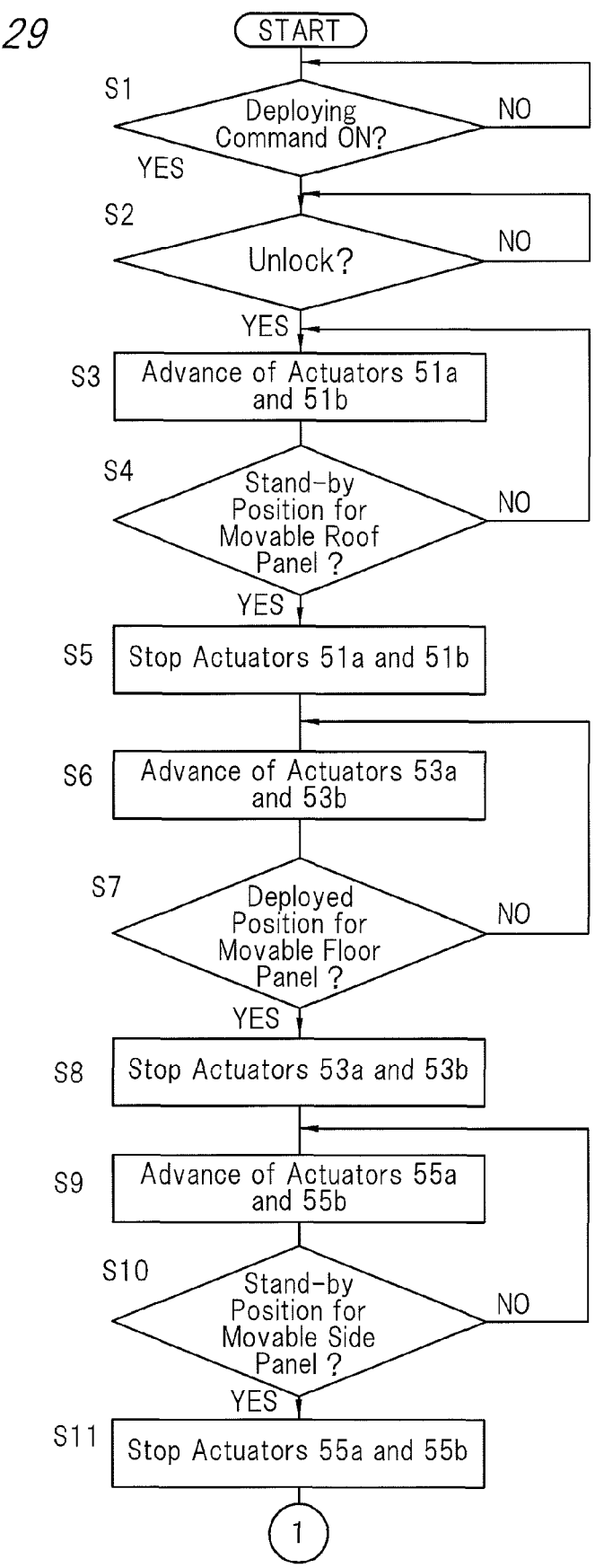
FIG. 29 is a flow chart showing a algorithm for driving the movable panels from the stored positions to the deployed positions in the shelter.
Figure 30:
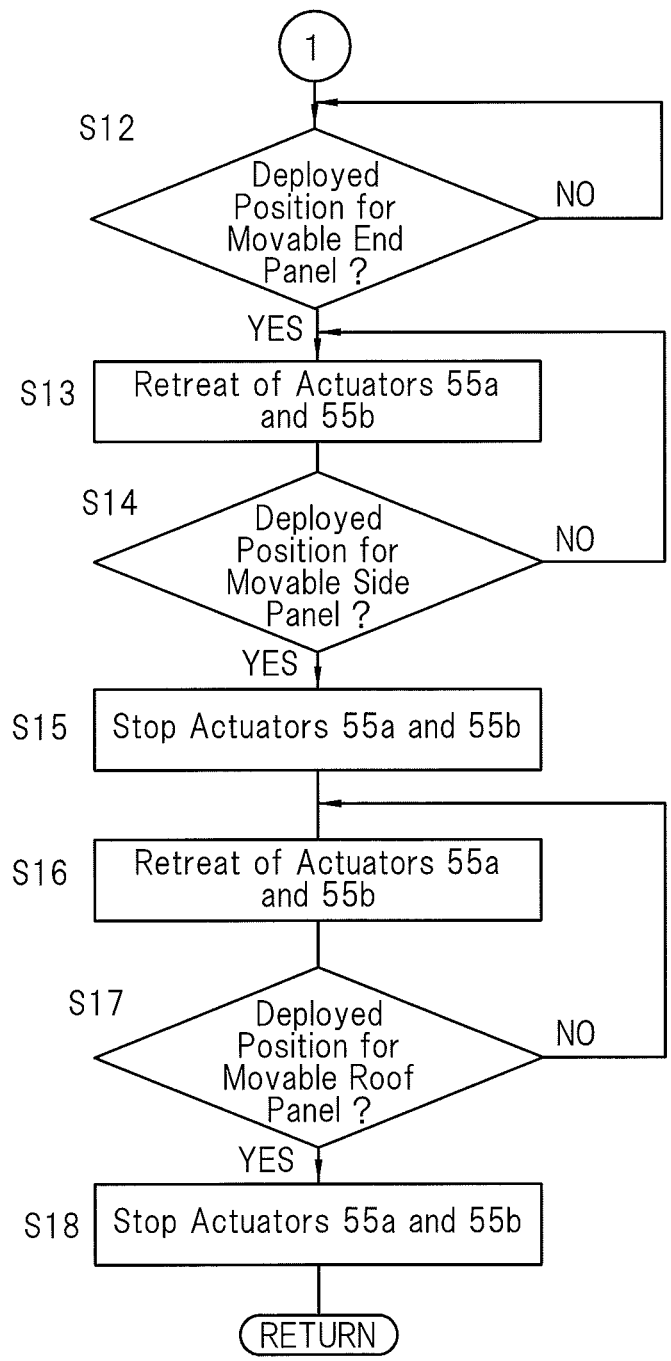
FIG. 30 is a flow chart showing a algorithm for driving the movable panels from the stored positions to the deployed positions in the shelter.

FIG. 29 and FIG. 30 are flowcharts showing a driving algorism for the movable panels when the shelter 10 is driven from the stored position to the deployed position.

When the movable panels provided to the shelter main body 20 are driven from the stored states to the deployed states, from among the movable panels on both sides of the shelter main body 20, the operator can select the movable panels on one side of the shelter main body 20 by operating the operation switch provided to the operation unit 34 is operated by the operator. When the deploying operation is performed, all the lock mechanisms are unlocked by the operator in advance. When the lock mechanisms are operated so as to shift into their unlocked states from their locked states, output signals are transmitted from lock sensors (not shown) provided to the lock mechanisms to the control unit 100.

For example, when a command for deploying each of the movable panels on the left side in FIG. 7 is input, the determination is made in Step S1 on whether this is a deploying command, and the determination is made in Step S2 on whether to unlock the lock mechanisms. When the determination is made that the lock mechanisms are in the unlocked states, a signal for moving the movable roof panel 37a from its standby position to its deployed position is transmitted to the solenoid valves V1 and V2. In this manner, the actuators 51a and 51b are driven, and the plungers 52a and 52b are driven so as to advance. When the position detecting sensors d3 of the actuators 51a and 51b detect that the plungers 52a and 52b reach their standby positions and the movable roof panel 37a reach their standby position, the actuators 51a and 51b are stopped (in Steps S4 and S5).

When the actuators 51a and 51b are stopped, driving signals are transmitted to the solenoid valves V3 and V4 in order to drive the movable floor panel 41a to the deployed position from the stored position. The drive command signals may be automatically transmitted to the solenoid valves V3 and V4 when the determination is made that the actuators 51a and 51b are stopped, or may be transmitted when the movable floor panel 41a is operated by the operator so as to start. When the actuators 53a and 53b are driven in order to pivot the movable floor panel 41a, the plungers 54a and 54b are driven so as to advance (in Step S6). When the position detecting sensors d2 of the actuators 53a and 53b detect that the plungers 54a and 54b reach to their deployed positions and the movable floor panel 41a reaches its deployed position, the actuators 53a and 53b are stopped (Step S8).

Next, when the actuators 53a and 53b are stopped, driving signals are transmitted to the solenoid valves V5 and V6 in order to drive the movable side panel 42a from the stored position to the deployed position. The drive command signals may be automatically transmitted to the solenoid valves V5 and V6 when the determination is made that the actuators 53a and 53b are stopped, or the drive command signals may be transmitted when the movable floor panel 42a is operated by the operator so as to start. The actuators 55a and 55b are driven and the plungers 56a and 56b are driven to advance in order to pivot the movable side panel 42a (Step S9). When it is detected by the position detecting sensors d3 of the actuators 55a and 55b that the plungers 56a and 56b are moved to advance to the standby position and the movable side panel 42a has reached the standby position, the actuators 55a and 55b are stopped (Steps S10 and S11).

In this manner, the movable panels such as the movable roof panel 37a are changed into the state shown in FIG. 16. In this state, when the movable end panels 43a and 43b are operated by the worker so as to move from the stored positions to the deployed positions, signals are transmitted to the control unit 100 from the position detecting sensors provided to the movable end panels 43a and 43b. When the determination is made in Step S12 that the movable side panels 43a and 43b reach the deployed positions, signals for driving the movable side panel 42a so that it returns to the deployed position from the standby position is transmitted to the solenoid valves V5 and V6. Start of the returning drive of the movable side panel 42a may be performed automatically, or it may be performed when switch operation is performed by the worker. When the actuators 55a and 55b are driven for returning movement of the movable side panel 42a, the plungers 56a and 56b are driven so as to retreat in Step S13. When the position detecting sensors d2 of the actuators 55a and 55b detect that the plungers 56a and 56b are moved so as to retreat from the standby positions to the deployed positions, and the movable side panel 42a reaches the deployed position, the actuators 55a and 55b are stopped (in Steps S14 and S15). This state corresponds to the state shown in FIG. 16.

When the movable side panel 42a reaches the deployed position, a driving signal for driving the movable roof panel 37a from the standby position to the deployed position in a retreat direction are transmitted to the solenoid valves V1 and V2. A returning movement of the movable roof panel 37a may automatically start, or the movable roof panel 37a may be returned when the worker operates it. When the actuators 51a and 51b are driven for the operation returning of the movable roof panel 37a, the plungers 52a and 52b are driven to retreat in Step 16. When the position detecting sensors d2 of the actuators 51a and 51b detect that the plungers 52a and 52b is moved so as to retreat from the standby positions to the deployed positions, and the movable roof panel 37a reaches the deployed position, the actuators 51*a* and 51*b* are stopped (in Step S17 and S18). This state corresponds to the state shown in FIG. 19.

When the movable panels are respectively returned from the deployed positions to the stored positions, an operation opposite to the above-described operation is performed. FIGS. 29 and 30 show a procedure for deploying the movable panels on the left side in FIG. 7, and this procedure is the same as a procedure for deploying the movable panels on the right side in FIG. 7.

The present invention is not limited to the above embodiment, but it may be variously modified without departing from the scope of the invention. As the actuator, an electric motor may be used instead of the hydraulic cylinder.

What is claimed is:

1. A deployment shelter having a floor panel and a roof panel fixed to the floor panel via poles arranged at four corners of the floor panel, and having a shelter main body forming an internal space, comprising:
   first and second movable roof panels which are respectively attached to one side portion and the other side portion of the roof panel via hinges, and which are pivoted to stored positions where the first and second movable roof panels extend in a vertical direction and deployed positions where the first and second movable roof panels extend laterally form the shelter main body;
   first and second movable floor panels which are respectively attached to one side portion and the other side portion of the floor panel via hinges, and which are pivoted to stored positions where the first and second movable floor panels extend in a vertical direction and deployed positions where the first and second movable floor panels extend laterally form the shelter main body;
   first and second movable side panels which are respectively attached to free ends of the movable floor panels via hinges, and which are pivoted to stored positions where the first and second movable side panels are stacked on inner faces of the movable floor panels and deployed positions where the first and second movable side panels are erected upward when the movable roof panels and the movable floor panels are in the deployed positions;
   four movable end panels which are respectively attached to the poles via hinges, and which are manually pivoted to stored positions where the movable end panels extend along side faces of the shelter main body and deployed positions where the internal space is formed by the movable roof panels, the movable floor panels, and the movable side panels which are in the deployed positions;
   four link mechanisms provided between the poles and the movable floor panels, and configured to keep the deployed floor panels in a horizontal position;
   first actuators which are arranged between the poles and the movable roof panels, and configured to drive the movable roof panels, wherein the first actuators are pivotably attached to the poles, and the first actuators have plungers connected to the movable roof panels;
   second actuators which are arranged between the poles and the movable floor panels, and configured to drive the movable floor panels, wherein the second actuators are pivotably attached to the poles, and the second actuators have plungers connected to the movable floor panels;
   third actuators which are arranged between the movable floor panels and the movable side panels, and configured to drive the movable side panels, wherein the third actuators are pivotably attached to the movable floor panels, and the third actuators have plungers connected to the movable side panels; and
   a control unit driving the first actuators to advance the movable roof panels to standby positions beyond the deployed positions,
   the control unit driving the second actuators to move the movable floor panels to the deployed positions when the movable roof panels reach the standby positions,
   the control unit driving the third actuators to advance the movable side panels to standby positions beyond the deployed positions when the movable floor panels reach the deployed positions,
   the control unit detecting that the movable end panels reach the deployed positions when the movable end panels are moved to the deployed positions by manual operation, and
   the control unit driving the first actuators and the third actuators to return the movable side panels and the movable roof panels to the deployed positions after the movable end panels are moved to the deployed positions by manual operation, thereby deploying the movable panels.

2. The deployment shelter according to claim 1, wherein when the movable side panels and the movable roof panels are returned to the deployed positions after the movable end panels are moved to the deployed positions by manual operation, the movable roof panels are returned to the deployed positions after the movable side panels are first returned to the deployed positions.

3. The deployment shelter according to claim 1, wherein the control unit selects, on the basis of an operation state of an operation switch, whether to deploy the first movable roof panel, the first movable floor panel, and the first movable side panel in advance of the second movable roof panel, the second movable floor panel, and the second movable side panel, and vice versa.

4. The deployment shelter according to claim 1, wherein the actuators are housed between the poles and the movable floor panels in the stored positions of the movable roof panels.

5. The deployment shelter according to claim 1, wherein the respective hinges supporting the movable end panels are provided with spring members for applying upwardly-directed elastic forces to the movable end panels so as to reduce operation forces required to pivot the movable end panels by manual operation, and so as to apply compression force to water-tightness seal members sealing gaps between the movable end panels and the movable roof panels, and the movable floor panels.

6. The deployment shelter according to claim 1, wherein protrusions are provided to ones of the movable roof panels, the movable side panels and the movable fool panels, and the movable end panels and
   recessed portions which the protrusions enter are provided to the others thereof, and
   the movable end panels in the deployed positions are positioned to the movable roof panels, the movable side panels, and the movable floor panels.

7. The deployment shelter according to claim 1, wherein water-tightness seals are provided between the movable end panels, and the movable roof panels, the movable floor panels and the movable side panels, and
   the water-tightness seal members seal gaps between the movable roof panels, the movable floor panels and the movable side panels, and the movable end panels with the movable roof panels and the movable side panels being disposed at the deployed positions thereof.

8. The deployment shelter according to claim 1, wherein the actuators are hydraulic cylinders each having a plunger which is reciprocated in an axial direction of the plunger by hydraulic pressure supplied from a hydraulic pump.

* * * * *

UNITED STATES PATENT AND TRADEMARK OFFICE
CERTIFICATE OF CORRECTION

PATENT NO. : 9,103,111 B2
APPLICATION NO. : 14/187509
DATED : August 11, 2015
INVENTOR(S) : Masaya Nakajima et al.

Page 1 of 1

It is certified that error appears in the above-identified patent and that said Letters Patent is hereby corrected as shown below:

In the Claims:
Claim 6, Column 16, line 52, after "removable" delete "fool" and substitute --floor--.

Signed and Sealed this
Twelfth Day of April, 2016

Michelle K. Lee
*Director of the United States Patent and Trademark Office*